(12) United States Patent
Tomoda et al.

(10) Patent No.: US 12,406,260 B2
(45) Date of Patent: Sep. 2, 2025

(54) FRAUD DETECTION SYSTEM, FRAUD DETECTION DEVICE, FRAUD DETECTION METHOD, AND PROGRAM

(71) Applicant: RAKUTEN GROUP, INC., Tokyo (JP)

(72) Inventors: Kyosuke Tomoda, Tokyo (JP); Shuhei Ito, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 276 days.

(21) Appl. No.: 17/596,419

(22) PCT Filed: Dec. 11, 2020

(86) PCT No.: PCT/JP2020/046320
§ 371 (c)(1),
(2) Date: Dec. 9, 2021

(87) PCT Pub. No.: WO2022/123779
PCT Pub. Date: Jun. 16, 2022

(65) Prior Publication Data
US 2022/0351211 A1 Nov. 3, 2022

(51) Int. Cl.
*G06Q 20/40* (2012.01)
*G06Q 20/32* (2012.01)

(52) U.S. Cl.
CPC ..... *G06Q 20/4016* (2013.01); *G06Q 20/3226* (2013.01); *G06Q 20/3274* (2013.01)

(58) Field of Classification Search
None
See application file for complete search history.

(56) References Cited

U.S. PATENT DOCUMENTS

| 10,445,711 | B1* | 10/2019 | Arumugam | G06Q 20/3274 |
| 10,878,668 | B1* | 12/2020 | van Beek Faletti | H04W 4/025 |
| 11,074,562 | B1* | 7/2021 | Phillips | G06Q 20/3274 |
| 11,182,794 | B1* | 11/2021 | Aument | G07F 7/0886 |

(Continued)

FOREIGN PATENT DOCUMENTS

| CN | 101641707 A | 2/2010 |
| CN | 106875178 A | 6/2017 |

(Continued)

OTHER PUBLICATIONS

Search Report of May 2, 2022, for corresponding EP Patent Application No. 20938506.1 pp. 1-10.

(Continued)

*Primary Examiner* — Divesh Patel
(74) *Attorney, Agent, or Firm* — HEA Law PLLC

(57) ABSTRACT

A fraud detection system for executing predetermined processing when a detection target is detected by using a detection device, the fraud detection system comprising at least one processor which determines, before the detection target is detected, whether a predetermined action has been performed by a user having a user terminal; executes, when it is determined that the predetermined action has been performed, fraud detection on the user based on identification information stored in the user terminal; and executes, when the detection target is detected, the predetermined processing based on an execution result of the fraud detection.

16 Claims, 13 Drawing Sheets

(56) References Cited

U.S. PATENT DOCUMENTS

| | | |
|---|---|---|
| 2003/0066883 A1 | 4/2003 | Yu |
| 2014/0059665 A1 | 2/2014 | Albani |
| 2018/0365915 A1 | 12/2018 | Vilhelmsen |
| 2019/0259021 A1 | 8/2019 | Lu et al. |
| 2019/0385170 A1 | 12/2019 | Arrabothu et al. |
| 2020/0272849 A1 | 8/2020 | Tomoda |
| 2021/0081937 A1* | 3/2021 | Yaqub ............... G06Q 20/40145 |
| 2021/0192610 A1* | 6/2021 | Bowie .................. G06Q 20/227 |
| 2021/0282005 A1* | 9/2021 | Tanaka .................. H04W 12/63 |
| 2022/0147966 A1* | 5/2022 | Babcock .............. G06Q 20/405 |

FOREIGN PATENT DOCUMENTS

| | | | |
|---|---|---|---|
| CN | 111125798 A | | 5/2020 |
| JP | 2002-007698 A | | 1/2002 |
| JP | 2008129626 A | * | 6/2008 |
| JP | 2008-250884 A | | 10/2008 |
| TW | 201826189 A | | 7/2018 |
| TW | 202044076 A | | 12/2020 |
| WO | 2008129828 A1 | | 10/2008 |
| WO | 2019/049210 A1 | | 3/2019 |

OTHER PUBLICATIONS

Office Action of Jul. 19, 2022, for corresponding TW Patent Application No. 110145881 with partial English translation, pp. 1-11.

Office Action of Aug. 2, 2023, for corresponding TW Patent Application No. 110145881 and partial translation thereof, pp. 1-11.

International Search Report for PCT/JP2020/046320, pp. 1-10 (see the transmittal letter regarding the concise explanation of relevance).

Office Action of Mar. 15, 2025, for corresponding CN Patent Application No. 202080042526.X with English translation, pp. 1-20.

* cited by examiner

FIG.4

| USER ACCOUNT | PASSWORD | NAME | APPLICATION ID | USAGE HISTORY |
|---|---|---|---|---|
| u00001 | ******** | TARO YAMADA | 9000015266198395 | 2020/10/15 15:25:44 POSITION (X1, Y1) WHEN CODE IS DISPLAYED AT FACILITY A ⋯<br>2020/10/16 09:11:06 POSITION (X2, Y2) WHEN CODE IS DISPLAYED AT FACILITY B ⋯<br>2020/10/20 12:09:14 POSITION (X3, Y3) WHEN CODE IS DISPLAYED AT FACILITY A ⋯<br>⋯ |
| u00002 | ****** | HANAKO SUZUKI | 1252330948930943 | 2020/10/08 08:11:15 POSITION (X4, Y4) WHEN CODE IS DISPLAYED AT FACILITY C ⋯<br>2020/10/12 16:24:22 POSITION (X5, Y5) WHEN CODE IS DISPLAYED AT FACILITY D ⋯<br>2020/10/14 11:52:23 POSITION (X6, Y6) WHEN CODE IS DISPLAYED AT FACILITY A ⋯<br>⋯ |
| u00003 | ********** | JIRO KIMURA | 7190193950001321 | 2020/10/12 12:11:25 POSITION (X7, Y7) WHEN CODE IS DISPLAYED AT FACILITY A ⋯<br>2020/10/12 15:26:51 POSITION (X8, Y8) WHEN CODE IS DISPLAYED AT FACILITY A ⋯<br>2020/10/12 16:46:16 POSITION (X9, Y9) WHEN CODE IS DISPLAYED AT FACILITY A ⋯<br>⋯ |
| ⋯ | ⋯ | ⋯ | ⋯ | |

| FACILITY ID | FACILITY NAME | LOCATION INFORMATION |
|---|---|---|
| f00001 | FACILITY A | ···, MINATO CITY, TOKYO, POSITION (Xa, Ya) |
| f00002 | FACILITY B | ···, YOKOHAMA CITY, KANAGAWA, POSITION (Xb, Yb) |
| f00003 | FACILITY C | ···, SETAGAYA CITY, TOKYO, POSITION (Xc, Yc) |
| ⋮ | ⋮ | ⋮ |

FIG.6

| EXECUTION ORDER | APPLICATION ID | PROBABILITY |
|---|---|---|
| 1 | 9000015266198395 | 95 |
| 2 | 1259103801837100 | 74 |
| 3 | 0189517098128433 | 62 |
| ... | ... | ... |

| APPLICATION ID | EXECUTION RESULT | EXECUTION DATE AND TIME |
|---|---|---|
| 7980184104101784 | VALID | 2020/11/05 12:41:30 |
| 3871982048197010 | FRAUD | 2020/11/05 12:45:21 |
| 1470908109281733 | VALID | 2020/11/05 12:41:32 |
| ⋮ | ⋮ | ⋮ |

D

FRAUD DETECTION SYSTEM, FRAUD DETECTION DEVICE, FRAUD DETECTION METHOD, AND PROGRAM

CROSS REFERENCE TO RELATED APPLICATIONS

This application is a National Stage of International Application No. PCT/JP2020/046320 filed on Dec. 11, 2020. The contents of the above document are incorporated herein by reference in its entirety.

TECHNICAL FIELD

The present disclosure relates to a fraud detection system, a fraud detection device, a fraud detection method, and a program.

BACKGROUND ART

Hitherto, there has been known a technology for executing fraud detection on users. For example, in Patent Literature 1, there is described a technology for executing fraud detection by using a machine learning model which has been caused to learn training data in which a feature amount of a user is input and a determination result of a validity of the user is output.

CITATION LIST

Patent Literature

[PTL 1] WO 2019/049210 A1

SUMMARY OF INVENTION

Technical Problem

The inventors have investigated executing fraud detection in a system in which predetermined processing is executed when a detection target is detected by using a detection device. As an example of such a system, there can be given a system in which a code (an example of a detection target) required for a user to enter a facility is issued, and processing for confirming the validity of identification information included in a code displayed on a user terminal (an example of predetermined processing) is executed when the code is detected by using a code reader (an example of a detection device).

In the above-mentioned system, it is required to shorten a period of time from detection of the detection target to completion of the predetermined processing. However, fraud detection like that in Patent Literature 1 often takes time. For this reason, when fraud detection is executed after the detection target is detected, and the predetermined processing is executed after it is confirmed that the user is not a fraudulent user, the fraud detection takes a very long time.

One object of the present disclosure is to shorten a period of time from detection of a detection target to completion of predetermined processing, even when fraud detection is executed.

Solution to Problem

According to one aspect of the present disclosure, there is provided a fraud detection system for executing predetermined processing when a detection target is detected by using a detection device, the fraud detection system including: action determination means configured to determine, before the detection target is detected, whether a predetermined action has been performed by a user having a user terminal; fraud detection means configured to execute, when it is determined that the predetermined action has been performed, fraud detection on the user based on identification information stored in the user terminal; and execution means configured to execute, when the detection target is detected, the predetermined processing based on an execution result of the fraud detection.

Advantageous Effects of Invention

According to the present disclosure, it is possible to shorten the period of time from the detection of the detection target to the completion of the predetermined processing, even when the fraud detection is executed.

BRIEF DESCRIPTION OF DRAWINGS

FIG. 4 is a table for showing a data storage example of a user database.

FIG. 5 is a table for showing a data storage example of a facility database.

FIG. 6 is a table for showing a data storage example of a fraud detection queue.

FIG. 7 is a table for showing a data storage example of an execution result database.

DESCRIPTION OF EMBODIMENTS

1. First Embodiment

Description is now given of an example of a fraud detection system according to a first embodiment of the present disclosure. In the first embodiment, the fraud detection system is described by taking a situation in which a user enters a facility as an example. However, the fraud detection system is applicable to any other situation. Other application examples are described in modification examples of the present disclosure described later.

1-1. Overall Configuration of Fraud Detection System

Figure 1:
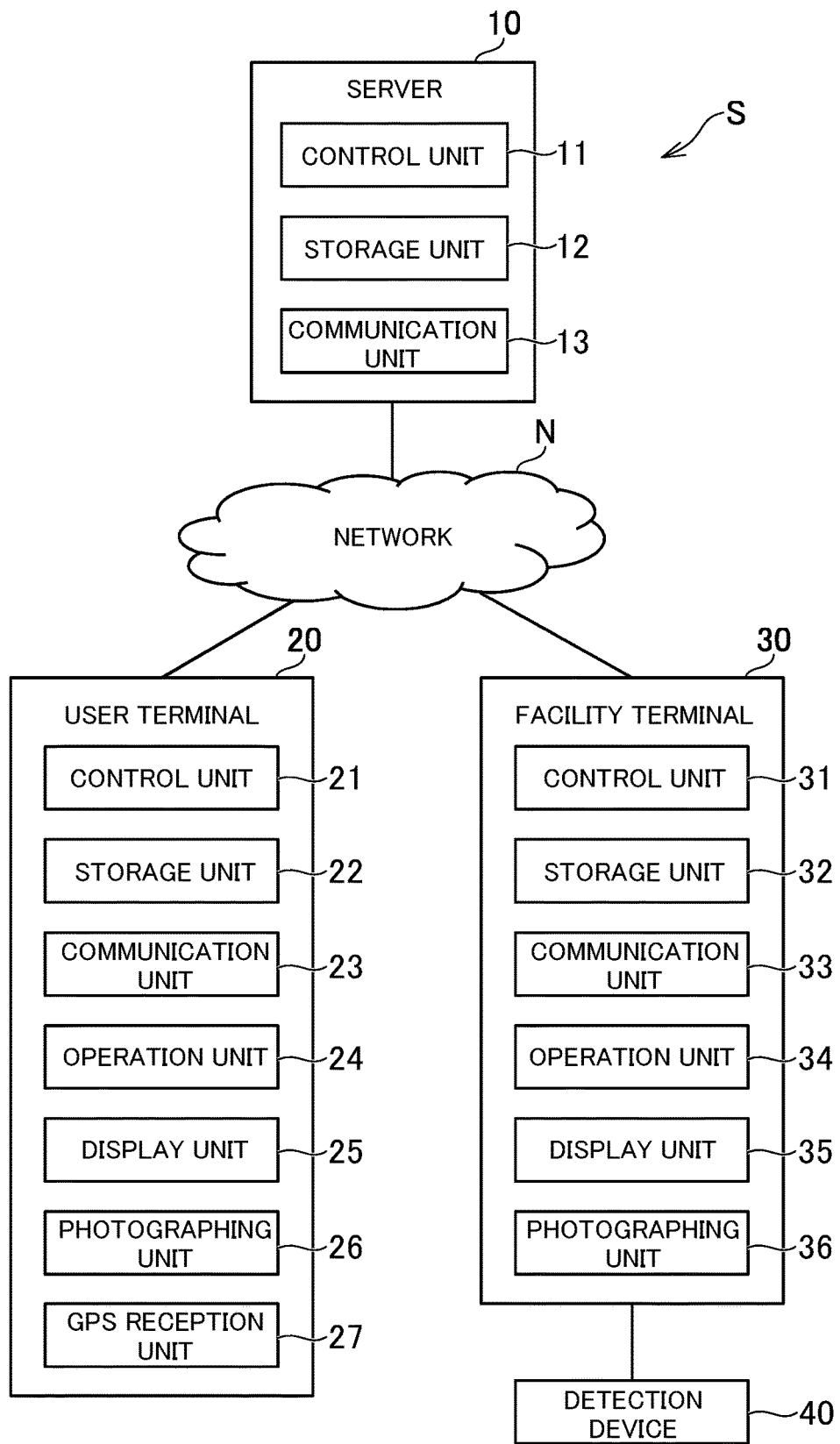
FIG. 1 is a diagram for illustrating an example of an overall configuration of a fraud detection system.

FIG. 1 is a diagram for illustrating an example of an overall configuration of the fraud detection system. As illustrated in FIG. 1, a fraud detection system S includes a server 10, a user terminal 20, and a facility terminal 30. Each of the server 10, the user terminal 20, and the facility terminal 30 can be connected to a network N, for example, the Internet. In FIG. 1, one server 10, one user terminal 20, and one facility terminal 30 are illustrated, but there may be a plurality of each of those.

The server 10 is a server computer. The server 10 is an example of a fraud detection device. The server 10 includes a control unit 11, a storage unit 12, and a communication unit 13. The control unit 11 includes at least one microprocessor. The storage unit 12 includes a volatile memory, for example, a RAM, and a non-volatile memory, for example, a hard disk drive. The communication unit 13 includes at least one of a communication interface for wired communication or a communication interface for wireless communication.

The user terminal 20 is a computer to be operated by a user. For example, the user terminal 20 is a smartphone, a tablet terminal, a wearable terminal, or a personal computer. The user terminal 20 includes a control unit 21, a storage unit 22, a communication unit 23, an operation unit 24, a display unit 25, a photographing unit 26, and a GPS reception unit 27. The physical configuration of each of the control unit 21, the storage unit 22, and the communication unit 23 may be the same as those of the control unit 11, the storage unit 12, and the communication unit 13, respectively.

The operation unit 24 is an input device, for example, a touch panel. The display unit 25 is a liquid crystal display or an organic EL display. The photographing unit 26 includes at least one camera. The GPS reception unit 27 is a receiver for receiving signals from satellites.

The facility terminal 30 is a computer arranged in a facility. For example, the facility terminal 30 is a tablet terminal, a personal computer, or a smartphone. The facility terminal 30 includes a control unit 31, a storage unit 32, a communication unit 33, an operation unit 34, a display unit 35, and a photographing unit 36. The physical configuration of each of the control unit 31, the storage unit 32, the communication unit 33, the operation unit 34, the display unit 35, and the photographing unit 36 may be the same as those of the control unit 11, the storage unit 12, the communication unit 13, the operation unit 24, the display unit 25, and the photographing unit 26, respectively.

The detection device 40 is connected by wire or in a wireless manner to the facility terminal 30. The detection device 40 is a device to be used to detect a detection target. The detection target is an object to be detected. The detection target may be a tangible object or an intangible object. The detection target may be any type of object, for example, an image displayed electronically, an image formed on a medium, for example, paper, a part of a user, an RFID tag, an IC chip (contactless or contact type), or electronic data. The detection target can be detected by any detection method, for example, an optical detection method, a detection method using wireless communication, or a detection method using a signal from a sensor.

In the first embodiment, there is described a case in which the detection target is a code displayed on the user terminal 20. For this reason, the term "code" in the first embodiment can be read as "detection target." The code itself may be a code conforming to various standards, for example, a bar code or a two-dimensional code. "Detection of the code" can also be referred to as "reading of the code." The code may be detected by the detection method corresponding to the standard.

It is sufficient that the detection device 40 be a device corresponding to the detection target. For example, the detection device 40 is a code reader, a camera, a scanner, a device for reading biological information, a sensor, an RFID reader, an IC chip reader, an antenna, or a computer capable of receiving electronic data. In the first embodiment, the detection device 40 is used to detect a code, and is external to the user terminal 20. As used herein, "external to" means not being included in a housing. In the first embodiment, the detection device 40 is external to the facility terminal 30, but the detection device 40 may be included in the facility terminal 30. Further, the code may be detected by the photographing unit in place of the detection device 40. In this case, the detection device 40 may be omitted, and the photographing unit 36 corresponds to the detection device in the present disclosure.

Programs and data described as being stored into the storage units 12, 22, and 32 may be supplied thereto via the network N. Further, the respective hardware configurations of the server 10, the user terminal 20, and the facility terminal 30 are not limited to the above-mentioned examples, and various types of hardware can be applied thereto. For example, the hardware configuration may include at least one of a reading unit (e.g., an optical disc drive or a memory card slot) for reading a computer-readable information storage medium, or an input/output unit (e.g., a USB port) for inputting and outputting data to/from an external device. For example, at least one of the program or the data stored in the information storage medium may be supplied through intermediation of at least one of the reading unit or the input/output unit.

1-2. Overview of First Embodiment

In the first embodiment, the user displays a code required for entry to a facility on the user terminal 20. When the user visits a facility and causes the detection device 40 to read the code, entry to the facility is permitted. The facility may be a facility of any type, such as an event venue, a stadium, a train station, an airport, an office building, a test venue, a polling place, a cinema, an art gallery, or a public facility. For example, an application for displaying the code is installed on the user terminal 20. The user displays the code by starting the application.

Figure 2:
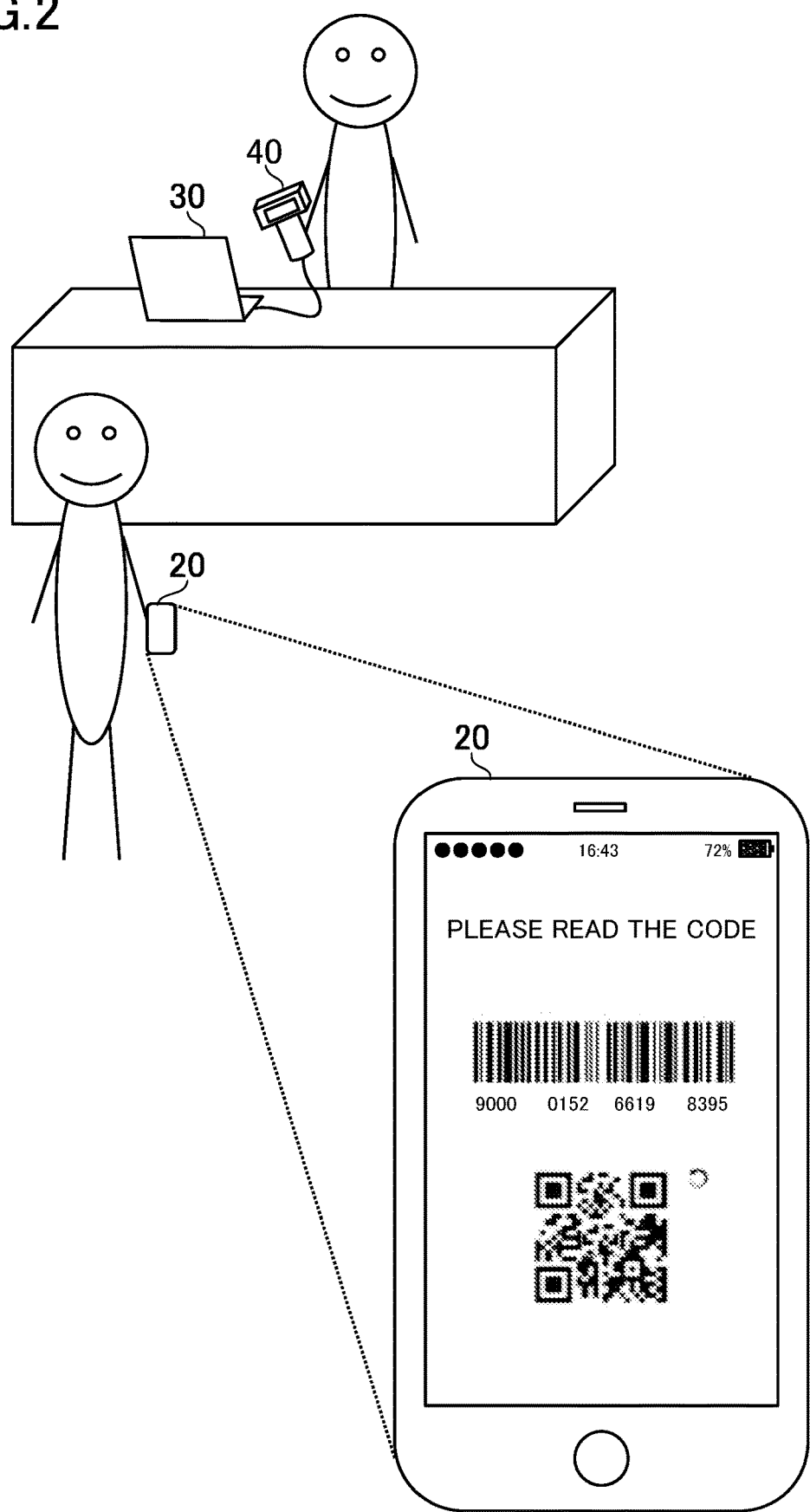
FIG. 2 is a diagram for illustrating an example of how a user enters a facility in a first embodiment of the present disclosure.

FIG. 2 is a diagram for illustrating an example of how the user enters the facility in the first embodiment. As illustrated in FIG. 2, the user carries a portable user terminal 20 and visits a facility. For example, a staff member is waiting at the facility. The staff member prompts the user to display the code on the user terminal 20. The user starts the application on the user terminal 20 to display the code, and presents the code to the staff member.

As illustrated in the enlarged user terminal 20 of FIG. 2, in the first embodiment, there is described a case in which both a barcode and a two-dimensional code are displayed, but only any one of the barcode and the two-dimensional code may be displayed. In the following description, when the bar code and the two-dimensional code are not distinguished, those codes are simply referred to as "code."

The code includes an application ID stored on the user terminal 20. The application ID is an example of identification information in the present disclosure. For this reason, the term "application ID" in the first embodiment can be read as "identification information." The identification information is information which can identify the user. In the first embodiment, there is described a case in which the identification information is issued so as not to be duplicated between users, but the identification information may be duplicated between users as long as the number of users having duplicate identification information is small. The identification information is not limited to an application ID, and may be any information. For example, the identification information may be a user account described later, or information called by another name. The identification information may have any format, and is expressed, for example, by numerals, characters, or a combination thereof.

In the example of FIG. 2, the numerical value "9000 0152 6619 8395" is the application ID. The application ID may have any format, and may include, for example, a character. The code displayed on the user terminal 20 is an image in which the application ID is coded. The code may include information other than the application ID.

For example, the user installs an application on the user terminal 20 and performs a predetermined use registration before visiting the facility. When the use registration is performed, the server 10 issues a user account and a password. The server 10 generates an application ID and transmits the generated application ID to the user terminal 20. The user terminal 20 receives the application ID and records the received application ID in the storage unit 22.

In the first embodiment, the application ID is updated each time the user displays the code. For example, the application ID is updated when the application has been started, when the application is recalled after entering a background mode, when a sleep mode is released after the application is started and then the sleep mode is entered, or when a predetermined update operation is performed under a state in which the application has been started. When the application ID is updated, the code displayed on the user terminal 20 is also updated.

When the user presents the code to a staff member, the staff member uses the detection device 40 to read the code. The facility terminal 30 extracts the application ID from the code and transmits the extracted application ID to the server 10. The server 10 confirms the validity of the application ID and transmits a confirmation result to the facility terminal 30. The facility terminal 30 displays the confirmation result received from the server 10. When the staff member sees the confirmation result and confirms the validity, the staff member permits the user to enter.

As described above, in the first embodiment, a service which permits entry to a facility by using a code is provided. In such a service, a malicious user may illegally obtain the user account of another user and enter the facility by impersonating the another user. For this reason, it is desired to execute fraud detection on the user before the user enters the facility, but as described in the "background art" section, fraud detection often takes time. Attempting to ensure the accuracy of fraud detection takes even more time. Accordingly, when the server 10 executes fraud detection after the detection device 40 reads the code, it takes a long time to permit entry of the user.

To deal with the problem, in the fraud detection system S, the server 10 executes fraud detection when a display action for displaying the code on the user terminal 20 is performed. That is, in principle, the server 10 executes fraud detection during a period from when the code is displayed on the user terminal 20 until the code presented by the user to the staff member is read by the detection device 40. For this reason, at the time point when the detection device 40 reads the code, fraud detection is complete in principle, and therefore the time until the user is permitted to enter is shortened. The details of this technology are now described.

1-3. Functions to be Implemented in First Embodiment

Figure 3:
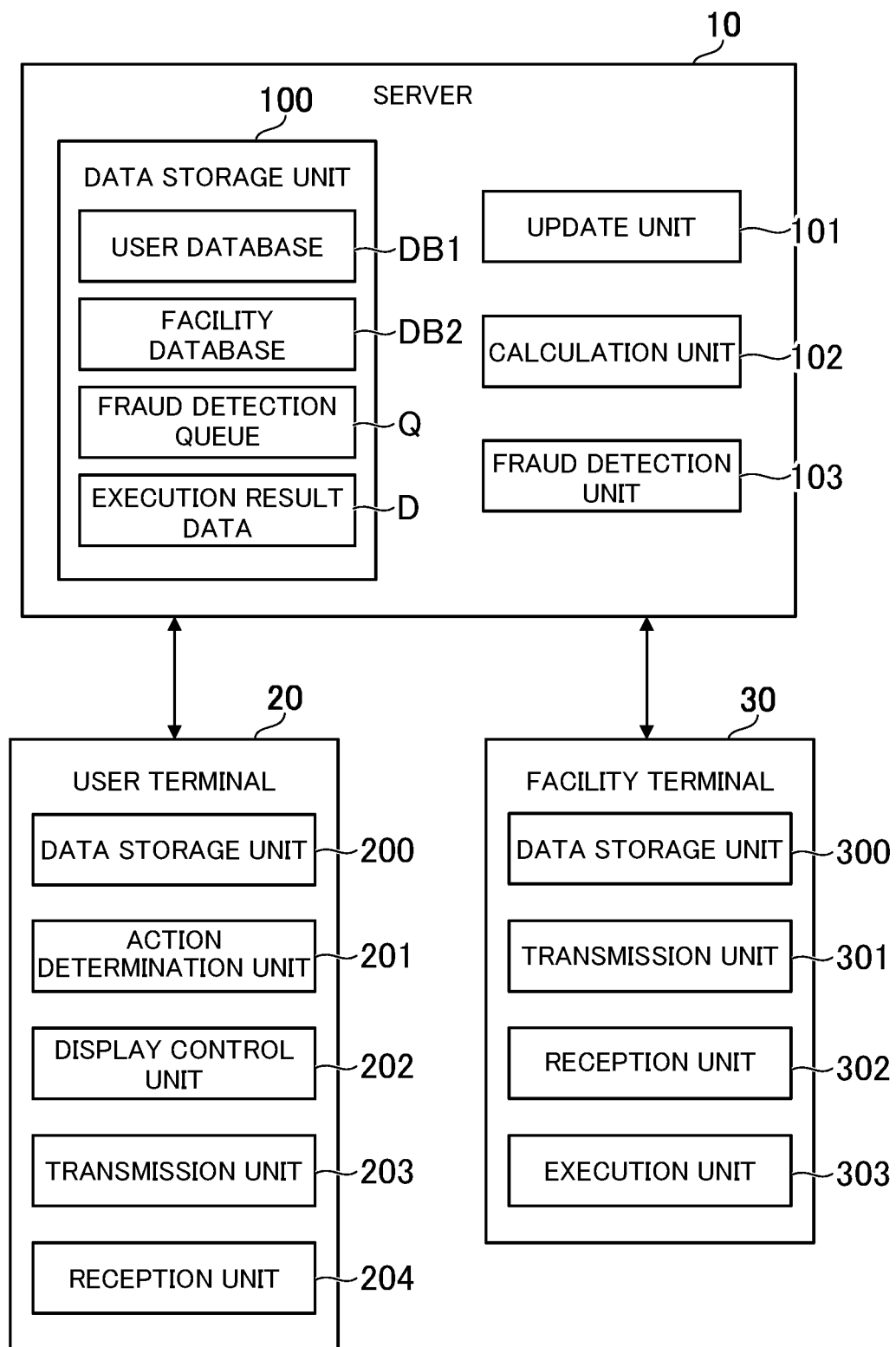
FIG. 3 is a function block diagram for illustrating an example of functions to be implemented in the fraud detection system.

FIG. 3 is a function block diagram for illustrating an example of the functions to be implemented in the fraud detection system S. Here, functions to be implemented in each of the server 10, the user terminal 20, and the facility terminal 30 are described.

[1-3-1. Functions to be Implemented in Server]

As illustrated in FIG. 3, a data storage unit 100, an update unit 101, a calculation unit 102, and a fraud detection unit 103 are implemented in the server 10.

[Data Storage Unit]

The data storage unit 100 is mainly implemented by the storage unit 12. The data storage unit 100 stores the data required for processing described in the first embodiment. Here, as an example of the data stored in the data storage unit 100, there are described a user database DB1, a facility database DB2, a fraud detection queue Q, and execution result data D.

FIG. 4 is a table for showing a data storage example of the user database DB1. As shown in FIG. 4, the user database DB1 is a database in which information on users is stored. For example, the user database DB1 stores a user account, a password, a name of the user, an application ID, and a service usage history. When the user performs a use registration, a new record is created in the user database DB1, and information on the user is stored.

The user account and the password are information required for logging in to the service. The server 10 issues an application ID to the user who has logged in. The application ID stored in the user database DB1 is also updated each time the application ID stored in the user terminal 20 is updated. The usage history is a usage situation of the service in the past. For example, a date and time when the user entered the facility, information which can identify the facility, and a position of the user terminal 20 at the time of code display are stored as the usage history.

FIG. 5 is a table for showing a data storage example of the facility database DB2. As shown in FIG. 5, the facility database DB2 is a database storing information on facilities. For example, the facility database DB2 stores a facility ID, a facility name, and location information. The facility ID is information which can uniquely identify the facility. The location information is information which can identify the location of the facility. For example, the location information includes at least one of an address of the facility or the latitude and longitude (coordinates) of the facility.

FIG. 6 is a table for showing a data storage example of the fraud detection queue Q. As shown in FIG. 6, the fraud detection queue Q is data relating to the users waiting for execution of fraud detection. For example, the fraud detection queue Q stores an execution order of fraud detection, the application ID of the users waiting for execution of fraud detection, and a probability calculated by the calculation unit 102. The users waiting for execution of fraud detection may be identified based on other information, for example, the user account, in place of the application ID. When fraud detection is executed on the first user in the execution order, the record of that user is deleted from the fraud detection queue Q, and the execution order is advanced by one.

FIG. 7 is a table for showing a data storage example of the execution result data D. As shown in FIG. 7, the execution result data D is data relating to the execution result of fraud detection. For example, the execution result data D stores the application ID of the user on which fraud detection has been executed, the execution result of fraud detection, and the execution date and time. The user on which fraud detection has been executed may be identified by using other information, for example, the user account, in place of the application ID. The records of users for which entry to the facility is complete may be deleted from the execution result data D.

The data stored in the data storage unit 100 is not limited to the example described above. For example, the data storage unit 100 stores a learning model for probability calculation by the calculation unit 102 and a learning model for fraud detection by the fraud detection unit 103. The learning models are models using machine learning. The machine learning itself can use various methods, for example, supervised machine learning, semi-supervised machine learning, or unsupervised machine learning.

For example, the learning models may be created by using a neural network.

[Update Unit]

The update unit 101 is mainly implemented by the control unit 11. The update unit 101 updates the application ID stored in the user terminal 20 when a predetermined update condition is satisfied. The update unit 101 does not update the application ID when the update condition is not satisfied.

The update condition may be any condition, and in the first embodiment, is the performance of the display action for displaying the code on the user terminal 20. That is, performing the display action corresponds to satisfying the update condition. The display action may be performed by any operation, and is, for example, an application operation of starting the application, a recall operation of recalling an application which has entered a background mode, a release operation of releasing a sleep mode, or a predetermined update operation performed under a state in which the application has been started.

The update condition is not limited to the example described above, and may be any condition. For example, the update condition may be a condition that a predetermined time has elapsed since the application ID was updated, a condition that a movement distance of the user terminal 20 is equal to or more than a threshold value, or a condition that a distance between the user terminal 20 and the facility is less than a threshold value. Further, for example, the update condition may be a condition that a predetermined time has elapsed and a movement distance of the user terminal 20 is equal to or more than a threshold value while the same code is displayed.

In the first embodiment, when it is determined that the display action has been performed, the code ID is updated and fraud detection is executed, and therefore the code update cycle and the fraud detection execution cycle match. However, the code update cycle and the fraud detection execution cycle are not required to match. That is, the code update condition is not required to match the execution condition (performance of a predetermined action described later) of fraud detection.

[Calculation Unit]

The calculation unit 102 is mainly implemented by the control unit 11. The calculation unit 102 calculates, based on a predetermined calculation method, a probability that the code displayed on the user terminal 20 is to be used by the user. For example, the calculation unit 102 calculates the probability based on the learning model for probability calculation. The learning model has learned training data including a pair of input data, which is a feature amount relating to the user who displayed the code, and output data indicating whether or not the code was actually used. The learning model outputs the probability that the code is to be used (the probability of being classified into a label indicating that the code is to be used) when input data having the same format as that of the input data included in the training data is input.

For example, when the user displays the code, the user terminal 20 transmits the application ID to the server 10. The calculation unit 102 identifies the user corresponding to the application ID received from the user terminal 20 based on the user database DB1. The calculation unit 102 generates a feature amount of the user as input data, and calculates the probability by using the learning model for probability calculation. The feature amount may also be calculated internally in the learning model.

The input data may include an item which is correlated with the probability that the code is to be used by the user. The input data may include any item, and for example, includes at least one of position information on the user terminal 20, the date/time or time when the code is displayed, the date/time or time when the display action is performed, the distance from the user terminal 20 to the closest facility, or the usage history of the user. The input data has the same format as that of the input data included in the training data of the learning model for probability calculation.

The input data can be expressed in any format, for example, in a vector format, in an array format, or by a single numerical value. The learning model for probability calculation may treat the input data itself as the feature amount, or the feature amount may be calculated based on the input data. The learning model for probability calculation outputs the probability corresponding to the input data.

The method of calculating the probability is not limited to the example described above. For example, the calculation unit 102 may calculate the probability based on a predetermined program without using the learning model for probability calculation. As another example, the calculation unit 102 may calculate the probability based on a predetermined mathematical expression or table. In those cases, the relationship between the feature amount relating to the user displaying the code and the probability that the code is to be used is only required to be defined in the program, mathematical expression, or table. Further, for example, the probability may be calculated based on a predetermined rule.

[Fraud Detection Unit]

The fraud detection unit 103 is mainly implemented by the control unit 11. The fraud detection unit 103 executes fraud detection on the user based on the application ID stored in the user terminal 20 when a predetermined action is determined to have been performed. The details of the predetermined action are described later. When it is not determined that the user has performed the predetermined action, the fraud detection unit 103 does not execute fraud detection on the user. That is, the user performing the predetermined action is a condition for executing fraud detection on the user.

Performing fraud detection on a user means determining whether or not the user is fraudulent, or calculating the probability that the user is fraudulent. As used herein, "fraud" refers to violation of the terms of use of the service. For example, "fraud" refers to a fraudulent login (spoofing), use of information obtained in a fraudulent manner, an attack on the server 10, or being a nuisance to other users.

In the first embodiment, there is described a case in which fraud detection is executed by using the learning model for fraud detection. The learning model has learned training data including a pair of input data, which is a feature amount relating to the user on which fraud detection is to be executed, and output data indicating whether or not the user is actually fraudulent. The learning model outputs, when input data having the same format as that of the training data is input, a label indicating whether or not the user is fraudulent, or the probability of the user being classified as being fraudulent.

For example, when it is determined that the predetermined action has been performed by a certain user, the user terminal 20 of the user transmits the application ID stored in the user terminal 20 to the server 10. The fraud detection unit 103 identifies, based on the user database DB1, the user who has performed the predetermined action (that is, the user on which fraud detection is to be executed) based on the application ID received from the user terminal 20. The fraud detection unit 103 generates the feature amount of the user as input data, and calculates the probability by using the learning model for fraud detection. The feature amount may also be calculated internally in the learning model. The fraud detection unit 103 stores the application ID of the user on which fraud detection has been executed, the execution result of the fraud detection, and the execution date and time which is the current date and time in the execution result data D in association with one another.

The input data may include an item which is correlated with the fraud. The input data may include any item, and for example, includes at least one of position information on the user terminal 20, the date/time or time when the code is displayed, the date/time or time when the display action is performed, the distance from the user terminal 20 to the closest facility, or the usage history of the user. The input data has the same format that of as the input data included in the training data of the learning model for fraud detection.

The input data can be expressed in any format, for example, in a vector format, in an array format, or by a single numerical value. The learning model for fraud detection may treat the input data itself as the feature amount, or the feature amount may be calculated based on the input data. The learning model for fraud detection outputs the execution result of the fraud detection corresponding to the input data.

In the first embodiment, displaying the code on the user terminal 20 corresponds to the predetermined action, and the user can be identified based on the application ID stored in the user terminal 20. Accordingly, the detection fraud unit 103 executes fraud detection based on the application ID stored in the user terminal 20 when it is determined that the display action has been performed. When it is not determined that the display action has been performed by a certain user, the fraud detection unit 103 does not execute fraud detection on the user. That is, the display of the code by the certain user is a condition for executing fraud detection on the user.

Various methods can be used for the method of implementing fraud detection itself. For example, fraud detection may be executed based on a predetermined rule without using the learning model for fraud detection. For example, the rule is determined based on the feature amount of the user on which fraud detection is to be executed. The fraud detection unit 103 determines users matching the rule to be fraudulent. Further, for example, the fraud detection unit 103 may execute fraud detection based on a predetermined program, mathematical expression, or table. In this case, the relationship between the feature amount of the user on which fraud detection is to be executed and whether or not the user is fraudulent is only required to be defined in the program, mathematical expression, or table.

In the first embodiment, the fraud detection unit 103 executes fraud detection based on the probability calculated by the calculation unit 102 when it is determined that the display action has been performed. For example, when there are a plurality of users on which fraud detection is to be executed (users who have displayed the codes on the respective user terminals 20), the fraud detection unit 103 determines the order in which fraud detection is to be executed based on the probability corresponding to each of the plurality of users. As the probability becomes higher, the fraud detection is executed earlier. That is, fraud detection is preferentially executed on users having a higher probability.

For example, the fraud detection unit 103 updates the fraud detection queue Q so that the fraud detection execution order matches a descending order of probability. When the fraud detection on a certain user is complete, the fraud detection unit 103 refers to the fraud detection queue Q, and executes fraud detection on the first user in the execution order. That is, the fraud detection unit 103 executes fraud detection on users having a relatively high probability before fraud detection on users having a relatively low probability. In other words, the fraud detection unit 103 executes fraud detection on each of the plurality of users in descending order of the probability of each of the plurality of users. The fraud detection unit 103 may execute fraud detection on a plurality of users at a time.

The method of executing fraud detection based on probability is not limited to the example described above. The fraud detection unit 103 may determine whether or not to execute fraud detection on a user based on the probability corresponding to that user. For example, the fraud detection unit 103 may not execute fraud detection on a certain user when the probability of the user is less than the threshold value, and may execute fraud detection on a certain user when the probability of the user is equal to or more than a threshold value. The threshold value may be a fixed value or a variable value corresponding to the user. Further, fraud detection may be executed without particularly calculating a probability. In this case, fraud detection is executed in the order in which the display action is received.

In the first embodiment, the fraud detection unit 103 executes fraud detection when the application ID is updated and it is determined that the display action has been performed. The fraud detection unit 103 does not execute fraud detection when the application ID has not been updated and/or it is not determined that the display action has been performed. Updating the application ID and performing the display action are conditions for executing fraud detection. For this reason, even when the code is displayed, fraud detection is not executed unless the application ID has been updated. However, in the first embodiment, the application ID is also updated as a part of the series of processes through which the code is displayed, and therefore those two conditions are satisfied at the same time. As described above, it is not required that those two conditions be satisfied at the same time.

The fraud detection unit 103 may execute fraud detection without any particular regard to the probability. In this case, the calculation unit 102 can be omitted. The fraud detection unit 103 may also execute fraud detection even when the application ID has not been updated. In this case, the update unit 101 can be omitted.

[1-3-2. Functions to be Implemented in User Terminal]

As illustrated in FIG. 3, in the user terminal 20, a data storage unit 200, an action determination unit 201, a display control unit 202, a transmission unit 203, and a reception unit 204 are implemented.

[Data Storage Unit]

The data storage unit 200 is mainly implemented by the storage unit 22. The data storage unit 200 stores the data required for the processing described in the first embodiment. For example, the data storage unit 200 stores an application for displaying the code and the application ID. As described above, the application ID stored in the data storage unit 200 is updated (overwritten) each time the display action is performed. The data storage unit 200 may also store the facility database DB2. The user terminal 20 may acquire the execution result of the fraud detection by the fraud detection unit 103, and store the acquired execution result of the fraud detection in the data storage unit 200. In this case, the facility terminal 30 may acquire the execution result of the fraud detection stored in the data storage unit 200 by using wireless communication or a code.

[Action Determination Unit]

The action determination unit 201 is mainly implemented by the control unit 21. The action determination unit 201 determines, before the code is detected, whether or not a predetermined action has been performed by the user having the user terminal 20. The predetermined action is an action performed before the code is detected. The predetermined action can also be referred to as preparatory or preliminary action performed before an operation to detect the code (for example, an operation of reading code by the detection device 40).

In the first embodiment, there is described a case in which the predetermined action is a display action for displaying the code on the user terminal 20. For this reason, in the first embodiment, "display action for displaying the code on the user terminal 20" can be read as "predetermined action." For example, each of the above-mentioned application start operation, recall operation, release operation, and update operation corresponds to "display action." The display action is not limited to those examples, and may be any action.

The action determination unit 201 determines, before the code is detected, whether or not the display action has been performed. For example, the action determination unit 201 determines, based on the operations performed on the operation unit 24, whether or not any one of the application start operation, recall operation, release operation, and update operation has been performed. The predetermined action is not limited to the examples of the first embodiment. Other action examples are described in the modification examples described later.

[Display Control Unit]

The display control unit 202 is mainly implemented by the control unit 21. The display control unit 202 displays, when a predetermined action is performed by the user, the code on the display unit 25 based on the application ID stored in the data storage unit 200. As described above, the application start operation, recall operation, release operation, and update operation are examples of the predetermined action. The display control unit 202 converts the application ID into a code based on procedures conforming to the code standard, and displays the code on the display unit 25.

[Transmission Unit]

The transmission unit 203 is mainly implemented by the control unit 21. The transmission unit 203 transmits any type of data to the server 10. For example, the transmission unit 203 transmits the application ID stored in the data storage unit 200 to the server 10. The transmission unit 203 may also transmit the application ID to the facility terminal 30. Further, the transmission unit 203 may transmit other data to the server 10 or the facility terminal 30.

[Reception Unit]

The reception unit 204 is mainly implemented by the control unit 21. The reception unit 204 receives any type of data from the server 10. For example, the reception unit 204 receives from the server 10 the application ID issued to the user. The reception unit 204 may also receive other data from the server 10. Further, the reception unit 204 may receive some type of data from the facility terminal 30.

[1-3-3. Functions to be Implemented in Facility Terminal]

As illustrated in FIG. 3, in the facility terminal 30, a data storage unit 300, a transmission unit 301, a reception unit 302, and an execution unit 303 are implemented.

[Data Storage Unit]

The data storage unit 300 is mainly implemented by the storage unit 32. The data storage unit 300 stores the data required for the processing described in the first embodiment. For example, the data storage unit 300 stores the facility ID of the facility in which the facility terminal 30 is arranged.

[Transmission Unit]

The transmission unit 301 is mainly implemented by the control unit 31. The transmission unit 301 transmits any type of data to the server 10. For example, the transmission unit 301 transmits, to the server 10, the facility ID stored in the data storage unit 300 and the application ID included in the code read by the detection device 40. The transmission unit 301 may also transmit other data to the server 10. Further, the transmission unit 301 may transmit some type of data to the user terminal 20.

[Reception Unit]

The reception unit 302 is mainly implemented by the control unit 31. The reception unit 302 receives any type of data from the server 10. For example, the reception unit 302 receives the execution result of the fraud detection from the server 10. The reception unit 302 may also receive other data from the server 10. Further, the reception unit 302 may receive some type of data from the user terminal 20.

[Execution Unit]

The execution unit 303 is mainly implemented by the control unit 31. In the fraud detection system S, when the code is detected by using the detection device 40, predetermined processing is executed. When the code is detected, the execution unit 303 executes the predetermined processing based on the execution result of the fraud detection. The execution unit 303 does not execute the predetermined processing when fraud by the user is detected, and executes the predetermined processing when fraud by the user is not detected. That is, the code being detected and fraud not being detected are conditions for executing the predetermined processing.

The predetermined processing is processing which is permitted (executed) when the execution result of the fraud detection is a predetermined result. In the first embodiment, there is described a case in which the displaying on the facility terminal 30 of a message indicating that the user is permitted to enter corresponds to the predetermined processing, but the predetermined processing may be any type of processing. For example, when an entrance gate is arranged in the facility, processing of opening the entrance gate may correspond to the predetermined processing. As another example, when a printer is connected to the facility terminal 30, the printing of a receipt or ticket indicating that the user is permitted to enter may correspond to the predetermined processing. It is sufficient that the predetermined processing be processing corresponding to the situation in which the fraud detection system S is applied. Examples of the predetermined processing in other application examples are described in the modification examples described later.

1-4. Processing to be Executed in First Embodiment

Figure 8:
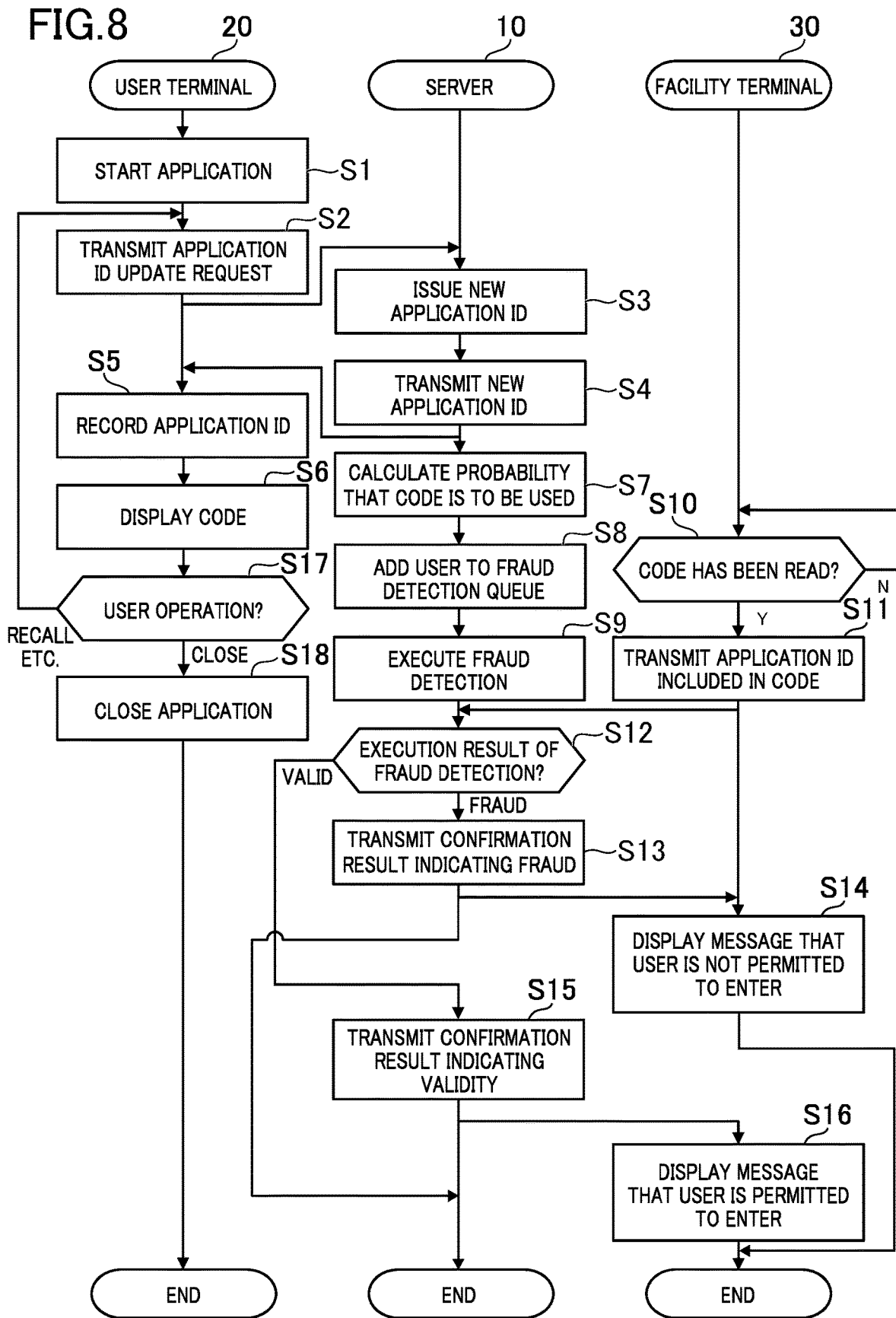
FIG. 8 is a flowchart for illustrating an example of processing to be executed in the first embodiment.

FIG. 8 is a flowchart for illustrating an example of processing to be performed in the first embodiment. The processing illustrated in FIG. 8 is performed by the control units 11, 21, and 31 performing operations in accordance with programs stored in the storage units 12, 22, and 32, respectively. The processing described below is an example of processing to be executed by the function blocks illustrated in FIG. 3. Further, it is assumed that the application has been installed in the user terminal 20, and that the application ID has been recorded in the user terminal 20.

As illustrated in FIG. 8, when the user terminal 20 receives a predetermined application start operation from the operation unit 24, the user terminal 20 starts the application stored in the storage unit 22 (Step S1), and transmits an application ID update request to the server 10 (Step S2). The application start operation is an operation for starting the application, for example, is an operation of selecting an icon of the application displayed on the user terminal 20. The update request is a notification for requesting that the application ID be updated, which is performed by transmitting data having a predetermined format. For example, the update request includes the application ID stored in the storage unit 22 and position information on the user terminal 20 detected by the GPS reception unit 27.

When the server 10 receives the update request, the server 10 issues a new application ID based on a predetermined issuance rule (Step S3). In Step S3, the server 10 issues a new application ID so as not to duplicate the application ID of another user stored in the user database DB1. The server 10 stores the issued application ID in the record of the user database DB1 in which the application ID included in the update request is stored. As a result, the application ID on the server 10 side is updated.

The server 10 transmits the new application ID issued in Step S3 to the user terminal 20 (Step S4). When the user terminal 20 receives the new application ID, the user terminal 20 records the application ID in the storage unit 22 (Step S5), and displays the code on the display unit 25 based on the application ID updated in Step S5 (Step S6). In Step S5, the user terminal 20 overwrites the old application ID (application ID included in the update request) with the new application ID. As a result, the application ID on the user terminal 20 side is updated.

The server 10 calculates the probability that the code displayed on the user terminal 20 is to be used based on the learning model for probability calculation (Step S7). In Step S7, the server 10 acquires the input data to be input to the learning model for probability calculation based on the position information on the user terminal 20 included in the update request and the information stored in the user database DB1. The server 10 inputs the input data to the learning model for probability calculation and acquires the probability output from the learning model for probability calculation.

The server 10 adds the user to the fraud detection queue Q based on the probability calculated in Step S7 (Step S8).

In Step S8, the server 10 adds the user to the fraud detection queue Q so that the fraud detection is executed earlier as the probability calculated in Step S7 becomes higher.

The server 10 executes fraud detection based on the fraud detection queue Q and the learning model for fraud detection (Step S9). The server 10 identifies the first user in the execution order among the users added to the fraud detection queue Q. The server 10 acquires the input data to be input to the learning model for fraud detection based on the position information on the user terminal 20 included in the user update request and the information stored in the user database DB1. The server 10 inputs the input data to the learning model for fraud detection and acquires the execution result of the fraud detection output from the learning model for fraud detection. The server 10 stores the execution result of the fraud detection in the execution result data D. The server 10 deletes the user on which fraud detection has been executed from the fraud detection queue Q. The processing step of Step S9 is executed as required.

The facility terminal 30 determines whether or not the code displayed on the user terminal 20 has been read by the detection device 40 (Step S10). When it is determined that the code has been read (Step S10: Y), the facility terminal 30 transmits the application ID included in the code to the server (Step S11). In the first embodiment, there is described a case in which Step S10 and Step S11 are executed after the execution of Step S8 and Step S9, but Step S8 and Step S9 may be executed in parallel to Step S10 and Step S11. For example, Step S10 may be executed before the execution of Step S9 is complete.

The server 10 receives the application ID, and then refers to the execution result of the fraud detection executed on the user corresponding to the application ID based on the execution result data D (Step S12). In Step S12, when the received application ID is stored in the execution result data D, the server 10 determines that the application ID is valid, and refers to the execution result of the fraud detection associated with the application ID. When the application ID is not stored in the execution result data D, the server 10 determines that the application ID is fraudulent, and the process proceeds to Step S13. In a case in which the application ID is not stored in the execution result data D, there is a possibility that the execution result of the fraud detection is to be added to the execution result data D immediately after that, and therefore the server 10 may wait for a certain amount of time and refer to the execution result data D again.

In Step S12, when user fraud is detected or when the application ID is determined to be fraudulent (Step S12: fraud), the server 10 transmits a confirmation result indicating fraud to the facility terminal 30 (Step S13). When the facility terminal 30 receives the confirmation result, the facility terminal 30 displays on the display unit 35 a message indicating that the user is not permitted to enter (Step S14), and the processing ends.

When user fraud is not detected (Step S12: valid), the server 10 transmits a confirmation result indicating validity to the facility terminal 30 (Step S15). When the facility terminal 30 receives the confirmation result, the facility terminal 30 displays on the display unit 35 a message indicating that the user is permitted to enter (Step S16), and the processing ends.

The user terminal 20 identifies a user operation based on a detection signal from the operation unit 24 (Step S17). In Step S17, a recall operation, a release operation, an update operation, or an operation to close the application is performed.

In Step S17, when a recall operation, a release operation, or an update operation has been performed (Step S17: recall etc.), the process returns to Step S2, and an update request is transmitted. The server 10 receives the update request, and advances the process to Step S3. In this case, a new application ID is issued and fraud detection is executed. Meanwhile, when an operation to close the application is performed in Step S17 (Step S17: close), the user terminal 20 closes the application (Step S18), and the processing ends.

According to the fraud detection system S of the first embodiment, when it is determined that the display action has been performed by the user, it is possible to shorten the period of time from detection of the code displayed on the user terminal to permission to enter the facility by executing fraud detection based on the application ID stored in the user terminal 20. Further, it is possible to reduce the processing load on the server 10 by using performing of the display action as a condition for executing fraud detection to reduce the number of times fraud detection is executed and to avoid the concentration of fraud detection execution at a specific point in time (distributing fraud detection execution). Even when the detection target is an object other than a code, and the predetermined processing is processing other than processing for entry to a facility, in a similar manner, the period of time from detection of the detection target to execution of the predetermined processing can be shortened and the processing load on the server 10 can be reduced. Further, highly accurate fraud detection can be executed by executing fraud detection immediately before the detection target is detected (immediately before predetermined processing is executed). As a result, security can be enhanced.

The fraud detection system S can optimize the execution order of fraud detection of users by executing fraud detection based on the probability that the code is to be used. Moreover, it is possible to effectively reduce the processing load on the server 10 by further reducing the number of times fraud detection is executed and effectively avoiding the concentration of fraud detection execution at a specific point in time.

Further, through execution of fraud detection when it is determined that the application has been updated and the display action has been performed, the fraud detection system S can prevent the execution of non-required fraud detection and effectively reduce the processing load on the server 10. In addition, the fraud detection system S can enhance security by executing fraud detection every time the application ID is updated.

2. Second Embodiment

Next, a fraud detection system S according to a second embodiment of the present disclosure is described. In the second embodiment, as an example, there is described a case in which the fraud detection system S is applied to a situation in which a code posted at a facility is read by the user terminal 20. That is, in the second embodiment, the user performs the operation of reading the code in place of the staff member of the facility. Description of parts which are the same as in the first embodiment is omitted.

In the second embodiment, the detection device 40 at the facility can be omitted. In the second embodiment, the photographing unit 26 of the user terminal 20 corresponds to the detection device in the present disclosure. For this reason, the term "photographing unit 26" in the second embodiment can be read as "detection device."

Figure 9:
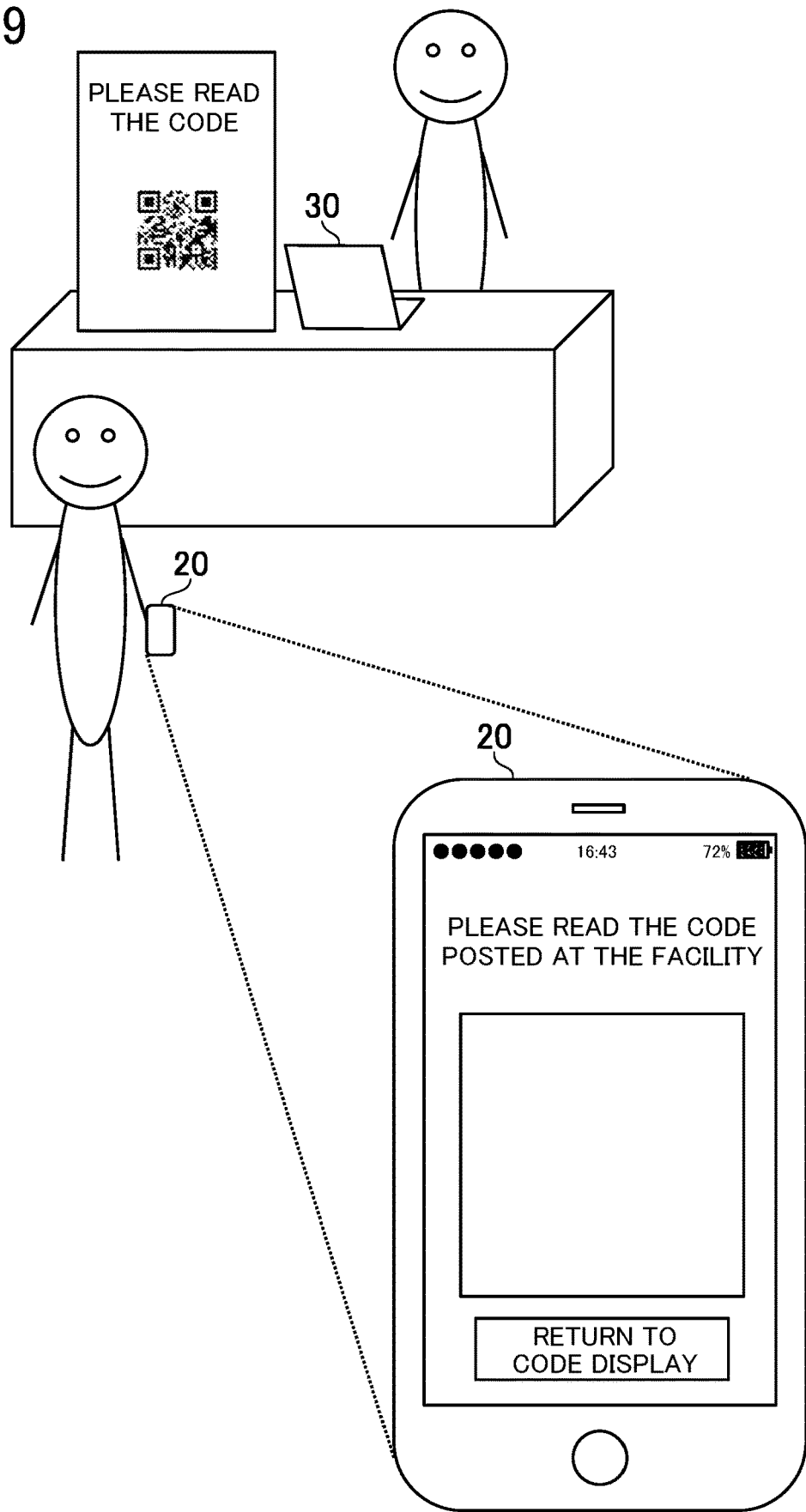
FIG. 9 is a diagram for illustrating an example of how a user enters a facility in a second embodiment of the present disclosure.

FIG. 9 is a diagram for illustrating an example of how a user enters a facility in the second embodiment. As illustrated in FIG. 9, a code including the facility ID is posted at the facility. When the user visits the facility, the user photographs the code by starting the application and the photographing unit 26 of the user terminal 20. The user terminal transmits the facility ID included in the code and the application ID stored in the user terminal 20 to the server 10.

In the second embodiment, it is assumed that the application ID is not displayed as a code, but the application may be switched between a mode of displaying the code as in the first embodiment and a mode of photographing the code as in the second embodiment. That is, a service like that in the first embodiment and a service like that in the second embodiment may both be presented to the user.

When the server 10 receives the facility ID and the application ID, the server 10 confirms the validity of the application ID, and transmits the confirmation result to the facility terminal 30 corresponding to the facility ID. The facility terminal 30 displays the confirmation result received from the server 10. When the staff member sees the confirmation result and confirms the validity, the staff member permits the user to enter. In this case as well, when the server 10 executes fraud detection after the user terminal 20 reads the code, it takes a long time to permit entry of the user.

To deal with the problem, in the fraud detection system S of the second embodiment, the server 10 executes fraud detection when a start action for starting the photographing unit 26 of the user terminal 20 is performed. That is, in principle, the server 10 executes fraud detection during a period from when the photographing unit 26 of the user terminal 20 is started until the photographing unit 26 reads the code. For this reason, at the time point when the photographing unit 26 reads the code, fraud detection is complete in principle, and therefore the time until the user is permitted to enter is shortened. The details of this technology are now described.

The detection target in the second embodiment is a code which is external to the user terminal 20. The code may be displayed on the facility terminal 30 or may be posted under a state in which the code is formed on a medium, for example, paper. In the second embodiment, the photographing unit 26 is used for code detection, and is included in the user terminal 20.

In the second embodiment, the predetermined action is a start action for starting the photographing unit 26 of the user terminal 20. The photographing unit 26 starts, for example, when the application is started, when a predetermined camera start operation is performed under a state in which the application has been started, when the application is recalled after entering a background mode, or when a sleep mode is released after the application is started and then the sleep mode is entered. In the second embodiment, there is described a case in which the application ID is updated when the photographing unit 26 starts, but as in the first embodiment, the update cycle of the application ID and the execution cycle of fraud detection may be different.

The action determination unit 201 determines, before the code is detected, whether or not the start action has been performed. For example, the action determination unit 201 determines, based on the operations performed on the operation unit 24, whether or not any one of the camera start operation, recall operation, or release operation has been performed. Those operations are examples of the start action. The start action is not limited to those examples, and may be any action.

The detection fraud unit 103 executes fraud detection based on the application ID stored in the user terminal 20 when it is determined that the start action has been performed. When it is not determined that the start action has been performed by a certain user, the fraud detection unit 103 does not execute fraud detection on the user. That is, the performing of the start action by the certain user is a condition for executing fraud detection on the user. The processing of the execution unit 303 is the same as that of the first embodiment, and, when the code is detected, the execution unit 303 executes the predetermined processing based on the execution result of the fraud detection.

Figure 10:
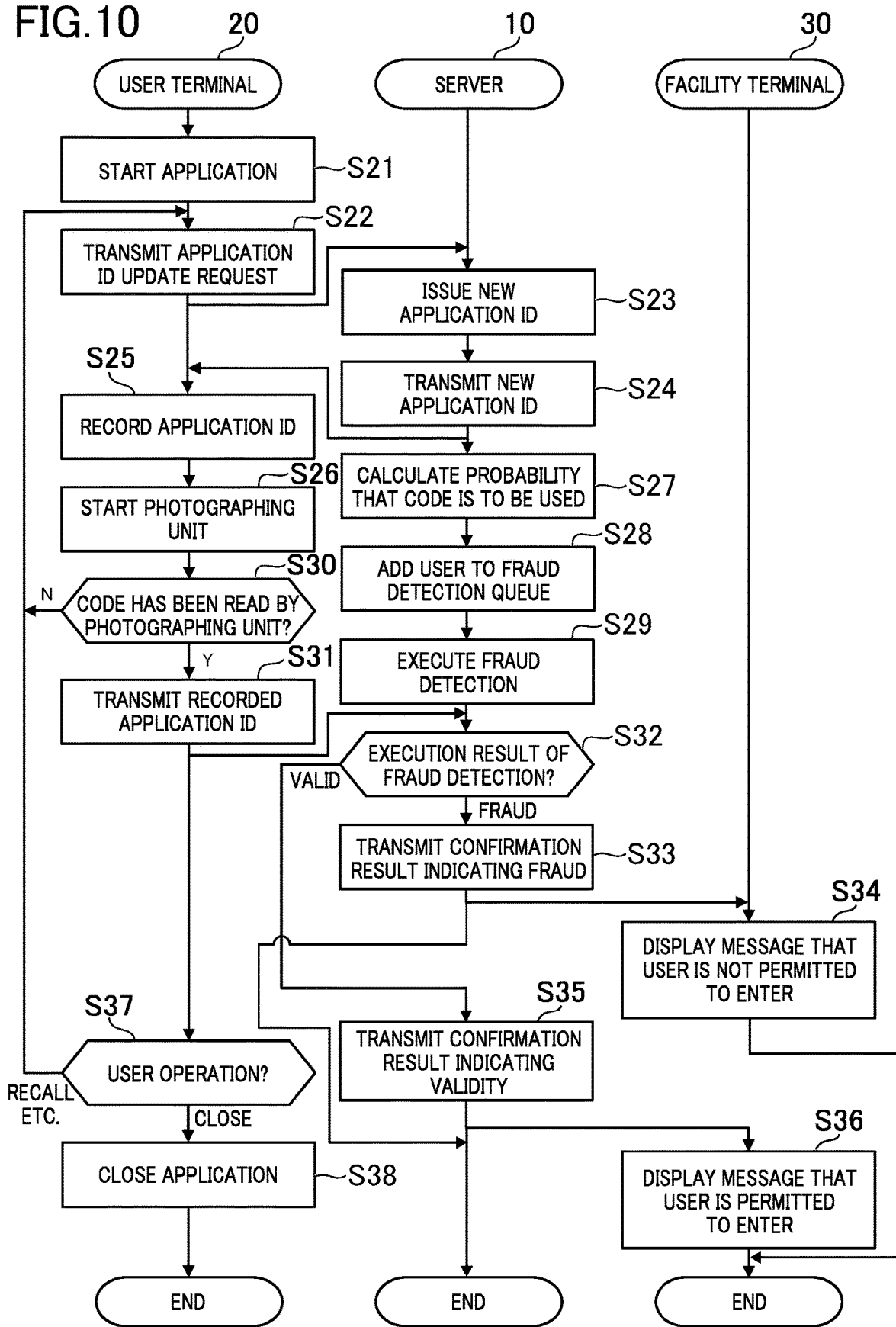
FIG. 10 is a flowchart for illustrating an example of processing to be executed in the second embodiment.

FIG. 10 is a flowchart for illustrating an example of processing to be executed in the second embodiment. As illustrated in FIG. 10, Step S21 to Step S25 are the same as Step S1 to Step S5, respectively. When the application ID is recorded in the storage unit 22 in Step S25, the user terminal 20 starts the photographing unit 26 (Step S26). Step S26 may be executed before Step S22 or Step S25. The following Step S27 to Step S29 are the same as Step S7 to Step S9, respectively. The probability in Step S27 that the code is used means the probability that the code photographed by the user is used, that is, the probability that the code is photographed by the user.

The user terminal 20 determines whether or not the code posted at the facility has been read by the photographing unit (Step S30). When it is determined that the code has been read (Step S30: Y), the user terminal 20 transmits the facility ID included in the code and the application ID recorded in the storage unit 22 to the server 10 (Step S31). In the second embodiment, there is described a case in which Step S30 and Step S31 are executed after the execution of Step S28 and Step S29, but Step S28 and Step S29 may be executed in parallel to Step S30 and Step S31. For example, Step S30 may be executed before the execution of Step S29 is complete. The following Step S32 to Step S38 are the same as Step S12 to Step S18, respectively.

According to the second embodiment, when it is determined that the start action has been performed, it is possible to shorten the period of time from detection of the code posted at the facility to permission to enter the facility by executing fraud detection based on the application ID stored in the user terminal 20. Further, execution of non-required fraud detection can be prevented and the processing load on the server 10 can be reduced by using performing of the start action as a condition for executing the fraud detection.

3. Modification Examples

The present disclosure is not limited to the embodiments described above, and can be modified suitably without departing from the spirit of the present disclosure.

Figure 11:
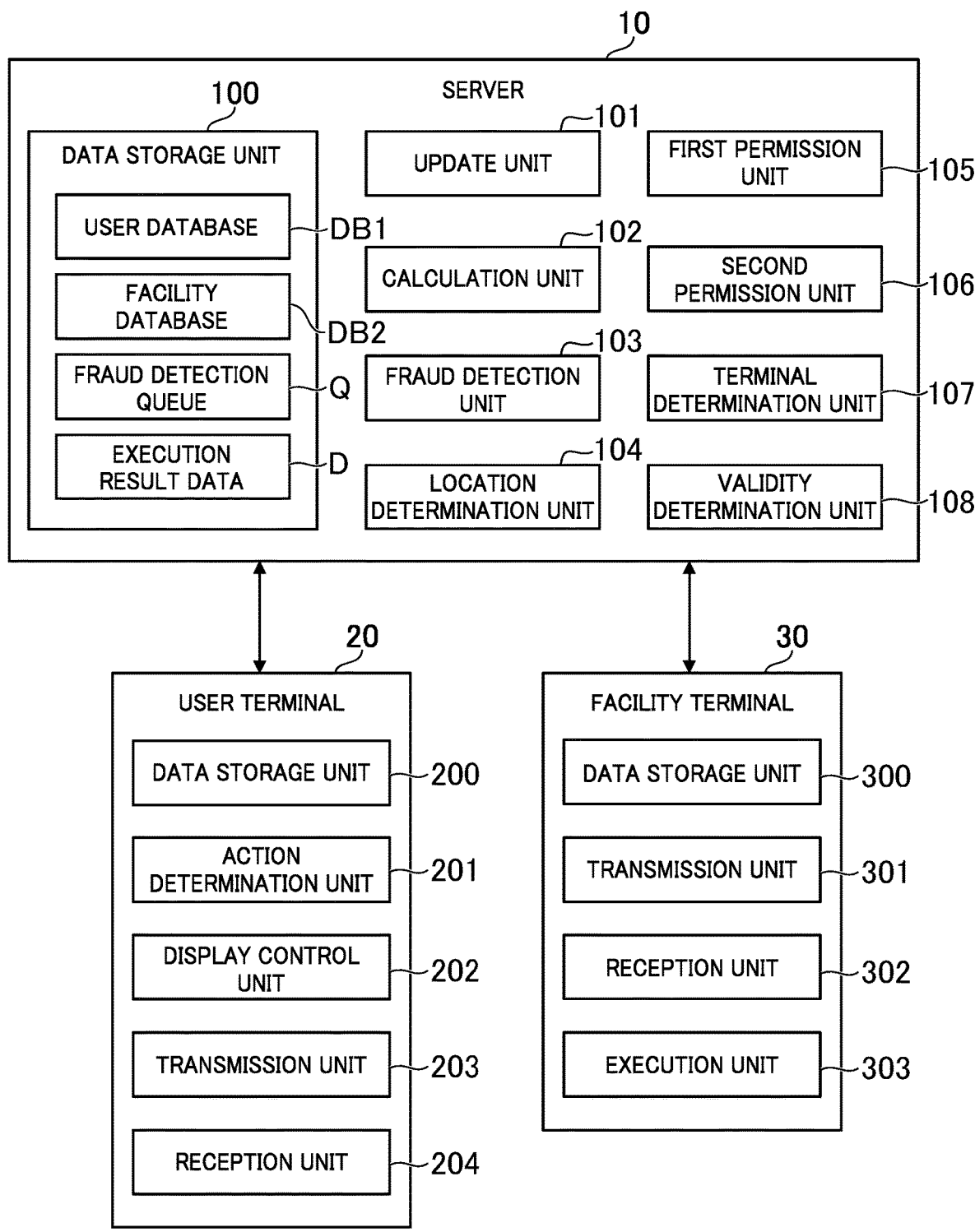
FIG. 11 is a function block diagram in modification examples of the present disclosure.

FIG. 11 is a function block diagram in the modification examples. As illustrated in FIG. 11, in addition to the functions described in the embodiments, a location determination unit 104, a first permission unit 105, a second permission unit 106, a terminal determination unit 107, and a validity determination unit 108 are implemented in the modification examples described below.

(1) For example, when fraud detection is executed every time the display action is performed, there is a possibility that fraud detection is executed even when the user displays the code as a trial, without intending to enter the facility. In this case, the server 10 may execute non-required fraud detection and the processing load may be increased. To deal with the problem, the code may be prevented from being displayed when the user is not at or near the facility. When the code is not displayed, the application ID is not updated, and therefore fraud detection is not executed. That is, even when the display action is performed, fraud detection is not executed unless display of the code is permitted.

In this modification example, as in the first embodiment, the detection device 40 is arranged in the facility. The facility is an example of a predetermined location. Accordingly, the term "facility" can be read as "predetermined location." The predetermined location is the location in which the detection device 40 is arranged or the location in which the code is posted. The predetermined location can also be referred to as the location visited by the user.

The fraud detection system S of this modification example includes the location determination unit 104 and the first permission unit 105. The location determination unit 104 and the first permission unit 105 are mainly implemented by the control unit 11.

Figure 12:
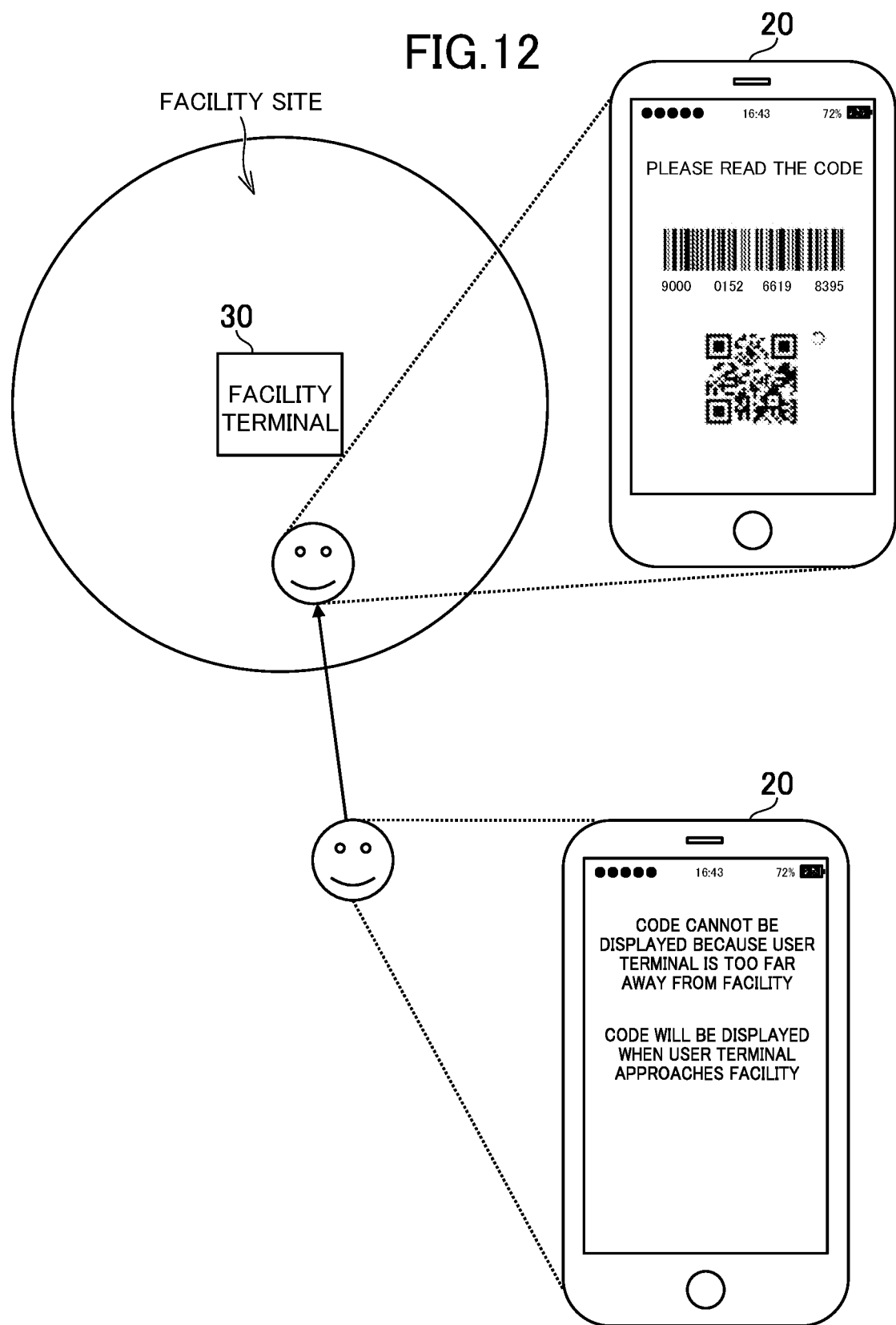
FIG. 12 is a diagram for illustrating an example of a screen of a user terminal corresponding to a position relationship between the user and a facility.

FIG. 12 is a diagram for illustrating an example of a screen of the user terminal 20 corresponding to a position relationship between the user and a facility. As illustrated in FIG. 12, the location determination unit 104 determines whether or not the user is at or near the facility. For example, the location determination unit 104 acquires position information from the user terminal 20, and determines whether or not a distance between the user terminal 20 and the facility is less than a threshold value based on the position information on the user terminal 20 and the location information on the facility stored in the facility database DB2.

The location determination unit 104 may determine the location of only the facility closest to the user terminal 20, or may determine the location of the facility which is second closest or subsequently closest to the user terminal 20. The location determination unit 104 does not determine that the user is at or near the facility when the distance between the user terminal 20 and the facility to be determined is equal to or more than the threshold value, and determines that the user is at or near the facility when the distance is less than the threshold value.

The determination method to be used by the location determination unit 104 is not limited to the example described above. For example, whether or not the user is at or near the facility may be determined based on a beacon arranged at the facility, a communication status between the user terminal 20 and a wireless communication device of the facility, information on the mobile base station to which the user terminal 20 belongs, or an image obtained by using a camera arranged in the facility.

The first permission unit 105 permits the display of the code on the user terminal 20 when it is determined that the user is at or near the facility, and does not permit the display of the code on the user terminal 20 when it is not determined that the user is at or near the facility. The user being at or near the facility is a condition for displaying the code on the user terminal 20.

In this modification example, the first permission unit 105 is included in the server 10, and therefore the first permission unit 105 controls whether or not to permit the display of the code by transmitting a predetermined notification to the user terminal 20. In this modification example, there is described a case in which the notification is a notification that the display of the code is not permitted, but the notification may be a notification that the display of the code is permitted.

For example, the first permission unit 105 transmits a notification indicating that the display of the code is not permitted to the user terminal 20 when it is not determined that the user is at or near the facility. The display control unit 202 does not display the code when the notification is received, and displays the code based on the application ID stored in the data storage unit 200 when the notification is not received. Not receiving the notification means not receiving any notification from the first permission unit 105, or receiving a notification permitting the display of the code.

The fraud detection unit 103 executes fraud detection when it is determined that the display action has been performed and the display of the code is permitted. The fraud detection unit 103 does not execute the fraud detection when it is not determined that the display action has been performed and/or when it is not determined that the display of the code is permitted. Both of those matters, that is, performing of the display action and permission of the display of the code, are conditions for executing the fraud detection. For this reason, even when the display action has been performed, the fraud detection is not executed unless the display of the code is permitted.

According to Modification Example (1) of the present disclosure, execution of non-required fraud detection can be prevented and the processing load on the server 10 can be reduced by permitting the display of the code on the user terminal 20 when it is determined that the user is at or near the facility.

In a case in which Modification Example (1) is applied to the second embodiment, when it is not determined that the user is at or near the facility, the photographing unit 26 may be restricted from starting under a state in which the application has been started. That is, when it is determined that the user is at or near the facility, the photographing unit 26 may be permitted to start under a state in which the application has been started. Unless the photographing unit 26 is started, the application ID is not updated, and the fraud detection is not executed. Even when the start action is performed, the fraud detection is not executed unless the photographing unit 26 is permitted to start.

(2) For example, regarding users for which fraud has been detected, the display of the code may be prevented because of the high probability of fraud being performed. The fraud detection system S of this modification example includes the second permission unit 106. The second permission unit 106 is mainly implemented by the control unit 11.

The second permission unit 106 permits the display of the code on the user terminal 20 when user fraud is not confirmed based on the execution result of the fraud detection, and does not permit the display of the code on the user terminal 20 when user fraud is confirmed based on the execution result of the fraud detection. The non-confirmation of user fraud is a condition for displaying the code on the user terminal 20.

In this modification example, the second permission unit 106 is included in the server 10, and therefore the second permission unit 106 controls whether or not to permit the display of the code by transmitting a predetermined notification to the user terminal 20. In this modification example, there is described a case in which the notification is a notification that the display of the code is not permitted, but the notification may be a notification that the display of the code is permitted.

For example, the second permission unit 106 transmits a notification indicating that the display of the code is not permitted to the user terminal 20 when user fraud is confirmed. The display control unit 202 does not display the code when the notification is received, and displays the code based on the application ID stored in the data storage unit 200 when the notification is not received. Not receiving the notification means not receiving any notification from the second permission unit 106, or receiving a notification permitting the display of the code.

Regarding users for which fraud has been detected, the display of the code may be permitted based on an operation by an administrator of the fraud detection system S after the administrator has performed a review. Further, for example, the display of the code may be restricted during a period from after fraud is detected until a predetermined time has elapsed, and the display of the code may be permitted when the predetermined time has elapsed.

The fraud detection unit 103 executes fraud detection when it is determined that the display action has been performed and display of the code is permitted. In Modification Example (1), the determination result of the first permission unit 105 serves as a condition for executing fraud detection, whereas Modification Example (2) of the present disclosure is different in that the determination result of the second permission unit 106 serves as the condition for executing fraud detection. The other points are the same, and therefore even when the display action has been performed, fraud detection is not executed unless the display of the code is permitted. The condition for executing fraud detection may also be both the determination result of the first permission unit 105 and the determination result of the second permission unit 106.

According to Modification Example (2), fraudulent users can be prevented from entering the facility and security can be enhanced by permitting the display of the code on the user terminal 20 when user fraud is not confirmed. Further, the display of the code is not permitted for fraudulent users, and therefore non-required fraud detection can be prevented from being executed after the fraud has been detected, and the processing load on the server 10 can be reduced.

In a case in which Modification Example (2) is applied to the second embodiment, when user fraud is confirmed, the photographing unit 26 may be restricted from starting under a state in which the application has been started. That is, when user fraud is not confirmed, the photographing unit 26 may be permitted to start under a state in which the application has been started. Even when the start action is performed, fraud detection is not executed unless the photographing unit 26 is permitted to start.

(3) Further, for example, in place of preventing the code from being displayed when the user is not at or near the facility as in Modification Example (1), the display of the code may be permitted but fraud detection may be prevented from being executed. Similarly to Modification Example (1), the fraud detection system S of this modification example includes the location determination unit 104.

The fraud detection unit 103 executes fraud detection when it is determined that the display action has been performed and it is determined that the user is at or near the facility. The fraud detection unit 103 does not execute fraud detection when it is not determined that the display action has been performed and/or when it is not determined that the user is at or near the facility. Both of those matters, that is, performing of the display action and the user being at or near the facility, are conditions for executing fraud detection. For this reason, even when the code is displayed, fraud detection is not executed unless the user is at or near the facility.

According to Modification Example (3) of the present disclosure, execution of non-required fraud detection can be prevented and the processing load on the server 10 can be reduced by executing fraud detection when it is determined that the display action has been performed and it is determined that the user is at or near the facility.

In a case in which Modification Example (3) is applied to the second embodiment, when it is determined that the start action has been performed and it is determined that the user is at or near the facility, fraud detection may be executed. That is, even when the start action has been performed, fraud detection may be prevented from being executed when the user is not at or near the facility.

(4) Further, for example, fraud may occur after fraud detection is executed, and therefore it is desired to execute fraud detection as close as possible to just before the code is read. However, even when the user visits a facility and displays the code, that does not mean that the code is immediately read by the detection device 40. In this regard, the user terminal 20 may be required to be in a predetermined orientation or attitude when the user causes the detection device 40 to read the code. Accordingly, fraud detection may be executed when the user terminal 20 is in a predetermined orientation or attitude.

Various methods can be used for detecting the orientation or attitude of the user terminal 20. For example, the user terminal 20 includes at least one sensor for detecting the orientation or attitude, and the orientation or attitude of the user terminal 20 is detected by using a detection signal from the at least one sensor. The sensor may be a sensor of any type, for example, a gyro sensor, an acceleration sensor, a geomagnetic sensor, or an electronic compass.

The fraud detection system S of this modification example includes the terminal determination unit 107. The terminal determination unit 107 is mainly implemented by the control unit 11.

Figure 13:
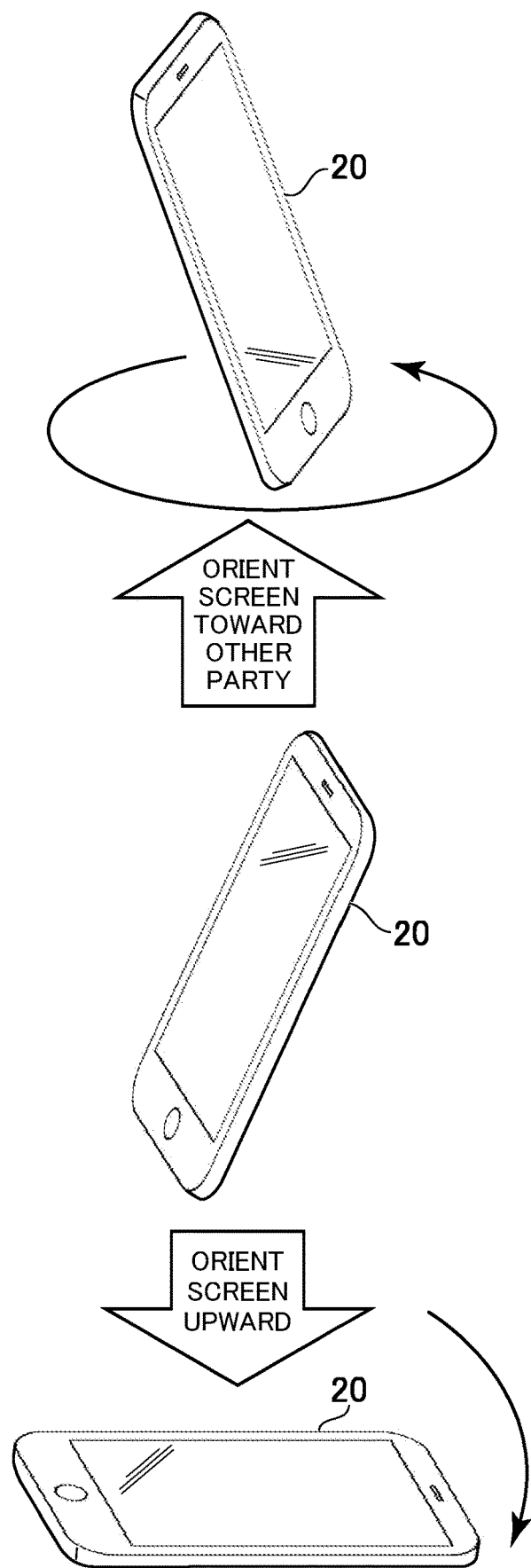
FIG. 13 is a diagram for illustrating an orientation or attitude of a user terminal in Modification Example (4) of the present disclosure.

FIG. 13 is a diagram for illustrating the orientation or attitude of the user terminal 20 in Modification Example (4) of the present disclosure. As illustrated in FIG. 13, the terminal determination unit 107 determines whether or not the orientation or attitude of the user terminal 20 is at the predetermined orientation or predetermined attitude for causing the detection device 40 to detect the code. Attitude can also be referred to as "tilt."

The predetermined orientation is an orientation in which the code is easily read by the detection device 40. The same applies to the predetermined attitude, and therefore the predetermined attitude is an attitude in which the code is easily read by the detection device 40. In other words, an orientation or attitude of the user terminal 20 which shows the display unit 25 (screen) to the staff member corresponds to the predetermined orientation or attitude.

For example, an orientation or attitude of the user terminal 20 which orients the display unit 25 (screen) directly upward (vertical direction) corresponds to the predetermined orientation or attitude. The terminal determination unit 107 determines whether or not a deviation (intersection angle) between the orientation of the display unit 25 (vertical direction of the display unit 25) and the vertical direction on the Earth is less than a threshold value (for example, 20 degrees). A case in which the deviation is less than the threshold value corresponds to having the predetermined orientation or attitude.

Further, for example, when the user terminal 20 is inverted, the orientation or attitude of the user terminal 20 which orients the display unit 25 (screen) toward the detection device 40 or the staff member corresponds to the predetermined orientation or attitude. The terminal determination unit 107 measures a change in the orientation or attitude of the user terminal 20, and determines whether or not a deviation (rotation angle) with the orientation or attitude when the code is displayed is equal to or more than a threshold value (for example, 150 degrees). A case in which the deviation is equal to or more than the threshold value corresponds to having the predetermined orientation or attitude.

In this modification example, the terminal determination unit 107 is included in the server 10, and therefore when the code is displayed, the user terminal 20 acquires terminal information on the orientation or attitude based on the detection signal of the above-mentioned sensor and transmits the acquired terminal information to the server 10. The server 10 receives the terminal information, and the terminal determination unit 107 determines whether or not the user terminal 20 is in the predetermined orientation or predetermined attitude based on the terminal information. The above-mentioned threshold value may be a fixed value or a variable value in accordance with a preference of the user.

The fraud detection unit 103 executes fraud detection when it is determined that the display action has been performed and it is determined that the user terminal 20 is in the predetermined orientation or predetermined attitude. The fraud detection unit 103 does not execute fraud detection when it is not determined that the display action has been performed and/or when it is not determined that the user terminal 20 is in the predetermined orientation or predetermined attitude. Both of those matters, that is, performing of the display action and the user terminal 20 being in the predetermined orientation or predetermined attitude, are conditions for executing fraud detection. For this reason, even when the code is displayed, fraud detection is not executed unless the user terminal 20 is in the predetermined orientation or attitude.

According to Modification Example (4), execution of non-required fraud detection can be prevented and the processing load on the server 10 can be reduced by executing fraud detection when it is determined that the display action has been performed and it is determined that the user terminal 20 is in the predetermined orientation or predetermined attitude.

Further, in a case in which Modification Example (4) is applied to the second embodiment, when it is determined that the start action has been performed and it is determined that the user terminal 20 is in the predetermined orientation or predetermined attitude, fraud detection may be executed. In this case, the predetermined orientation or attitude is an orientation or attitude which orients the photographing unit 26 toward the code in order to read the code posted at the facility. For example, a case in which a deviation (intersection angle) between the photography direction of the photographing unit 26 and the horizontal direction on the Earth is less than a threshold value (for example, 20 degrees) corresponds to having the predetermined orientation or attitude.

(5) Further, for example, fraud may occur during the period between execution of fraud detection and reading of the code, and therefore the validity of the execution result of fraud detection may be determined. The fraud detection system S of this modification example includes the validity determination unit 108. The validity determination unit 108 is mainly implemented by the control unit 11.

The validity determination unit 108 determines a validity of fraud detection executed in the past based on a predetermined determination condition. The determination condition may be any condition, for example, the conditions described in the following Modification Examples (5-1) to (5-3). Two or more conditions of the following Modification Examples (5-1) to (5-3) may be combined. Similarly to Modification Examples (1) to (4), the following Modification Examples (5-1) to (5-3) can be applied to the pattern of the first embodiment as well as to the pattern of the second embodiment.

(5-1) For example, the predetermined determination condition is a condition relating to an elapsed time since execution of fraud detection in the past. This elapsed time can also be referred to as "valid period of fraud detection." The elapsed time is the duration from the date and time of the most recent execution of fraud detection to the current date and time. The validity determination unit 108 determines the validity based on the elapsed time. In this modification example as well, when fraud detection is executed on a certain user, the fraud detection unit 103 stores the date and time of the execution of fraud detection in the execution result data D. The valid period of fraud detection may be stored in the execution result data D in place of the execution date and time.

The validity determination unit 108 acquires the elapsed time based on the current date and time and the date and time of execution of fraud detection. When the elapsed time is equal to or more than a threshold value, the validity determination unit 108 determines that the execution result of fraud detection is not valid, and when the elapsed time is less than the threshold value, the validity determination unit 108 determines that the execution result of fraud detection is valid. The validity determination unit 108 may also determine whether or not the valid period of fraud detection has elapsed based on the current date and time. In this modification example, the validity determination unit 108 is included in the server 10, and therefore the validity determination unit 108 transmits the determination result of validity to the facility terminal 30.

The execution unit 303 executes predetermined processing based on the execution result of fraud detection and the determination result of the validity of the fraud detection. The execution unit 303 does not execute the predetermined processing when it is determined that the execution result of fraud detection is not valid, regardless of the execution result of fraud detection. The execution unit 303 executes the predetermined processing when the execution result of fraud detection is valid and user fraud is not detected. That is, fraud not being detected and the execution result being valid are conditions for execution of the predetermined processing. For this reason, even when fraud is not detected, the predetermined processing is not executed unless validity can be confirmed.

According to Modification Example (5-1) of the present disclosure, security can be enhanced by permitting entry to the facility based on the execution result of fraud detection and the determination result of the validity of the fraud detection.

Further, a time limit on the validity of the fraud detection can be set to enhance security by determining the validity of the fraud detection based on the elapsed time since execution of fraud detection in the past. For example, an older execution result of fraud detection is less reliable, and therefore an old fraud detection may be determined to be invalid and fraud detection may be executed again.

(5-2) Further, for example, the predetermined determination condition is a condition relating to a movement distance by the user since the fraud detection has been executed in the past. The validity determination unit 108 determines the validity based on the movement distance. This movement distance is the total movement distance from the date and time of the most recent execution of fraud detection to the current date and time.

The movement distance of the user may be calculated by the user terminal 20 or by the server 10. For example, the user terminal 20 tracks position information detected by the GPS reception unit 27 and measures the movement distance. The movement distance of the user can be measured by any other method. For example, the movement distance of the user can be measured by using a change in the mobile base station information on the user terminal 20 or in information on a communication device performing wireless communication to and from the user terminal 20.

The server 10 receives the position information from the user terminal 20 as required, and measures the movement distance. When the movement distance of the user is equal to or more than a threshold value, the validity determination unit 108 determines that the execution result of the fraud detection is not valid, and when the movement distance is less than the threshold value, the validity determination unit 108 determines that the execution result of the fraud detection is valid. The processing of the execution unit 303 is as described in Modification Example (5-1).

According to Modification Example (5-2) of the present disclosure, a limit on the movement distance can be set for the validity of fraud detection to enhance security by determining the validity of the fraud detection based on the movement distance of the user since execution of fraud detection in the past. For example, when the user performs movements which are too unnatural, there is a possibility that the user is performing fraud, and therefore the fraud detection performed before that time point may be determined to be invalid and fraud detection may be executed again.

(5-3) Further, for example, the predetermined determination condition is a condition relating to a distance between the facility and a position of the user terminal 20 at a time when the display action is performed. The validity determination unit 108 determines the validity based on the distance. The position of the user terminal 20 at the time when the display action is performed is the position of the user terminal 20 at the point in time when the code is displayed or the time around that point in time, and for example, is the position of the user terminal 20 at the time when an application start operation, a recall operation, a release operation, or an update operation is received.

The method of acquiring the distance is as described in Modification Example (1). When the movement distance is equal to or more than a threshold value, the validity determination unit 108 determines that the execution result of the fraud detection is not valid, and when the movement distance is less than the threshold value, the validity determination unit 108 determines that the execution result of the fraud detection is valid. The processing of the execution unit 303 is as described in Modification Example (5-1).

According to Modification Example (5-3) of the present disclosure, a limit on the above-mentioned distance can be set for the validity of fraud detection to enhance security by determining the validity of the fraud detection based on a distance between the facility and a location of the user terminal 20 at the time when the display action is performed. For example, there is a possibility that the user performs fraud after leaving the facility, and therefore the fraud detection performed before that time point may be determined to be invalid and fraud detection may be executed again.

(6) Further, for example, there has been described as an example a situation in which the user enters a facility, but the fraud detection system S is applicable to an electronic payment service. In this modification example, there is described as an example a situation in which the user visits a shop and purchases a product. In this modification example, the shop corresponds to the facility, and the facility terminal 30 is arranged in the shop. For example, the facility terminal 30 is a POS terminal, an automatic vending machine, or a ticket vending machine. The shop may be an unmanned shop or a shop, for example, a mobile sales vehicle.

First, as in the first embodiment, as an example, description is given of a case in which a code displayed on the user terminal 20 is read by the detection device 40. The detection device 40 is connected to the facility terminal 30 of the shop. The user takes a shop product to a cash register. A shop clerk reads a barcode of the product by using the detection device 40. In the case of a self-checkout, in place of the shop clerk, the user may read the barcode of the product by using the detection device 40. A product database is stored in the facility terminal 30, and the facility terminal 30 acquires the product information corresponding to the barcode. The product information is, for example, a product name and price. The facility terminal 30 records the product information on, for example, the products brought by the user to the cash register and a total amount of money of those products in the storage unit 32.

The user starts the application of the user terminal 20 to display the code, and tells the shop clerk that the user is to use an electronic payment service. When the application starts, updating of the application ID and execution of fraud detection are executed in the same manner as described in the first embodiment. The shop clerk reads the code displayed on the user terminal 20 by using the detection device 40. The facility terminal 30 transmits the application ID included in the code to the server 10.

The server 10 receives the application ID, and executes payment processing based on the execution result of fraud detection corresponding to the application ID. In this modification example, the fraud detection may be executed by any method. For example, the fraud detection unit 103 executes fraud detection based on information on, for example, the location of the user, the payment amount, or payment frequency in past payments.

The server 10 does not execute the payment processing when fraud is detected, and executes the payment processing when fraud is not detected. The server 10 transmits an execution result of the payment processing to the facility terminal 30. The facility terminal 30 displays the execution result of the payment processing. When the payment processing is not executed, the shop clerk tells the user to that effect and prompts the user to pay by using another payment method. When the payment processing is executed, the shop clerk performs a predetermined accounting operation, and the user receives the product.

In this modification example, the predetermined processing is payment processing. The execution unit 303 is included in the server 10, and is mainly implemented by the control unit 11. When the code is detected, the execution unit 303 executes the payment processing based on the execution result of fraud detection and the payment information on the user. The payment information is information required for payment, for example, a credit card number, debit card information, bank account information, electronic money information, point information, virtual currency information, or wallet information. The payment information is stored in the user database DB1.

The execution unit 303 does not execute the payment processing when user fraud is detected, and executes the payment processing based on payment information when user fraud is not detected. That is, the code being detected and fraud not being detected are conditions for executing payment processing. When the payment processing is executed, the execution result is displayed on the facility terminal 30.

The user can select a plurality of payment methods. The execution unit 303 executes the payment processing based on the payment information corresponding to the payment method selected by the user. The payment method selected by the user may be registered in the user database DB1 in advance or recorded in the user terminal 20. Information for identifying the payment method selected by the user may be included in the code displayed on the user terminal 20.

According to Modification Example (6) of the present disclosure, the time until payment processing is executed can be shortened. For example, even when a timeout period after the code is detected is set to a short period, the payment processing can be executed after fraud detection is executed. For example, when the timeout period in point payment is set to be much shorter than the timeout period in the credit card payment, it is difficult to execute the fraud detection after the code for point payment is detected, but even in such a case, the fraud detection can be executed. Further, for example, it is also possible to supplement a shortfall in points in the point payment with electronic money charged at that moment by using a credit card. In this case, the timeout period in the point payment may serve as a reference, and despite the fact that the credit card payment is executed as behind-the-scenes processing, it is difficult to execute fraud detection. Even in such a case, fraud detection can be executed.

As in the second embodiment, the fraud detection system S is also applicable to an electronic payment service in which a code posted at a shop is read by using the user terminal 20. The flow until the barcode of the product is read is the same as the flow described above. The user tells the shop clerk that the user is to use an electronic payment service, starts the application and the photographing unit 26 of the user terminal 20, and reads the code posted at the cash register by using the photographing unit 26. When the application and the start action are performed, updating of the application ID and execution of fraud detection are executed in the same manner as described in the second embodiment. The user completes payment by performing a predetermined operation, for example, inputting the total amount of money, to the application, and shows the shop clerk the payment completion screen. The shop clerk checks the screen, and passes the product to the user. The fraud detection system S is also applicable in such cases.

(7) Further, for example, the above-mentioned modification examples may be combined.

Further, for example, the predetermined action determined by the action determination unit 201 is not limited to the example described above. It is sufficient that the predetermined action be an action performed before detection of the detection target. For example, a predetermined time elapsing under a state in which the code is displayed on the user terminal 20 may correspond to the predetermined action. As another example, the user standing still under a state in which the code is displayed on the user terminal 20 may correspond to the predetermined action. In addition, for example, the user saying a predetermined word under a state in which the code is displayed on the user terminal 20 may correspond to the predetermined action. In this case, a microphone on the user terminal 20 or the facility terminal 30 corresponds to the detection device.

Further, for example, the predetermined action is not required to be an action causing the code to be displayed. For example, the predetermined action may be that the user goes to or near to the facility, without displaying the code. As another example, the predetermined action may be that the user terminal is in a predetermined orientation or attitude, without displaying the code. In addition, for example, the predetermined action may be that the user says a predetermined word, without displaying code. When the detection target is not a code and is an RFID tag or an IC chip, for example, the display of the code does not serve as a condition, and therefore the predetermined action may be one or more of the actions described above. Moreover, for example, fraud detection may be executed when the predetermined action is performed by the user in a predetermined time slot.

Further, for example, the fraud detection system S is also applicable to services other than the services described in the embodiments and modification examples described above, such as in an electronic ticket service, an automatic ticket gate service, an electronic money transfer service, or an SNS service.

Further, for example, the fraud detection system S is also applicable to a case in which predetermined processing (for example, remittance processing between users or processing for adding a friend on an SNS) is executed by reading a code displayed on the user terminal 20 of a certain user by using the user terminal 20 of another user. In this case, the photographing unit 26 of the user terminal 20 of the another user corresponds to the detection device of the present disclosure.

Further, for example, the fraud detection system S is also applicable to a case in which biological information on the user is detected by using the detection device 40. The detection target is the biological information on the user, and the detection device 40 is used to detect the biological information. The predetermined action is the user approaching or touching the detection device 40 (the user being at or near the facility). The action determination unit 201 determines, before the biological information is detected, whether or not the user has performed an action of approaching or touching the detection device 40. The fraud detection unit 103 executes fraud detection based on the application ID when it is determined that the user has approached or touched the detection device 40. The execution unit 303 executes, when biological information is detected, the predetermined processing based on the execution result of fraud detection.

Further, for example, although the main functions are implemented in the server 10 in the case described above, the functions may be distributed among a plurality of computers. For example, the functions may be distributed among the server 10, the user terminal 20, and the facility terminal 30. For example, fraud detection may be executed by the user terminal 20 or the facility terminal 30 in place of the server 10. In this case, the user terminal 20 or the facility terminal 30 corresponds to the fraud detection device. In addition, for example, the execution of the predetermined processing may be performed by the server 10 or the user terminal 20 in place of the facility terminal 30. Moreover, for example, the facility terminal 30 may be omitted. Further, when the fraud detection system S includes a plurality of server computers, for example, the functions may be distributed among the plurality of server computers.

The invention claimed is:

1. A fraud detection system using a machine learning model for executing predetermined processing when a detection target is detected by using a detection device, the fraud detection system comprising at least one processor configured to:
   determine, before the detection target is detected, whether a predetermined action has been performed by a user having a user terminal;
   execute, when it is determined that the predetermined action has been performed, fraud detection on the user based on identification information stored in the user terminal, said fraud detection being executed by the machine learning model;
   execute, when the detection target is detected, the predetermined processing based on an execution result of the fraud detection;
   wherein the detection target is a code displayed on the user terminal,
   wherein the detection device is used to detect the code, and is external to the user terminal,
   wherein the predetermined action is a display action for displaying the code on the user terminal,
   wherein the at least one processor is configured to determine, before the code is detected, whether the display action has been performed,
   wherein, when it is determined that the display action has been performed, the at least one processor is configured to execute the fraud detection based on the identification information,
   wherein, when the code is detected, the at least one processor is configured to execute the predetermined processing based on the execution result of the fraud detection;
   wherein the machine learning model outputs a probability of the code being used by the user;
   wherein the machine learning model outputs a fraud detection result, in real time, using the probability as an input;
   wherein when fraud is detected, the user is not permitted to enter a facility; and
   wherein when fraud is not detected, the user is permitted to enter the facility by opening an entrance gate to the facility.

2. The fraud detection system according to claim 1, wherein the at least one processor is configured to calculate, based on a predetermined calculation method, a probability that the code displayed on the user terminal is to be used by the user, and
   wherein, when it is determined that the display action has been performed, the at least one processor is configured to execute the fraud detection based on the probability.

3. The fraud detection system according to claim 1,
   wherein the detection device is arranged at a predetermined location,
   wherein the at least one processor is configured to:
      determine whether the user is at or near the predetermined location;
      permit display of the code on the user terminal when it is determined that the user is at or near the predetermined location, and
      execute the fraud detection when it is determined that the display action has been performed and when the display of the code is permitted.

4. The fraud detection system according to claim 1, wherein the at least one processor is configured to permit display of the code on the user terminal when fraud by the user is not confirmed based on the execution result of the fraud detection, and wherein the at least one processor is configured to execute the fraud detection when it is determined that the display action has been performed.

5. The fraud detection system according to claim 1, wherein the detection device is arranged at a predetermined location,
wherein the at least one processor is configured to determine whether the user is at or near the predetermined location, and
wherein the at least one processor is configured to execute the fraud detection when it is determined that the display action has been performed and it is determined that the user is at or near the predetermined location.

6. The fraud detection system according to claim 1, wherein the at least one processor is configured to determine whether an orientation or an attitude of the user terminal is a predetermined orientation or a predetermined attitude for causing the detection device to detect the code, and
wherein the at least one processor is configured to execute the fraud detection when it is determined that the display action has been performed and it is determined that the user terminal is in the predetermined orientation or the predetermined attitude.

7. The fraud detection system according to claim 1, wherein the at least one processor is configured to update the identification information stored in the user terminal when a predetermined update condition is satisfied, and
wherein the at least one processor is configured to execute the fraud detection when the identification information has been updated and it is determined that the predetermined action has been performed.

8. The fraud detection system according to claim 1, wherein the at least one processor is configured to determine a validity of the fraud detection executed in the past based on a predetermined determination condition, and
wherein the at least one processor is configured to execute the predetermined processing based on the execution result of the fraud detection and a determination result of the validity of the fraud detection.

9. The fraud detection system according to claim 8, wherein the predetermined determination condition is a condition relating to an elapsed time since the fraud detection has been executed in the past, and
wherein the at least one processor is configured to determine the validity based on the elapsed time.

10. The fraud detection system according to claim 8, wherein the predetermined determination condition is a condition relating to a movement distance by the user since the fraud detection has been executed in the past, and
wherein the at least one processor is configured to determine the validity based on the movement distance.

11. The fraud detection system according to claim 8, wherein the detection device is arranged at a predetermined location,
wherein the predetermined determination condition is a condition relating to a distance between the predetermined location and a position of the user terminal at a time when the predetermined action is performed, and
wherein the at least one processor is configured to determine the validity based on the distance.

12. The fraud detection system according to claim 1, wherein the detection target is a code external to the user terminal,
wherein the detection device is used to detect the code, and is included in the user terminal,
wherein the predetermined action is a start action for starting the detection device of the user terminal,
wherein the at least one processor is configured to determine, before the code is detected, whether the start action has been performed,
wherein, when it is determined that the start action has been performed, the at least one processor is configured to execute the fraud detection based on the identification information, and
wherein, when the code is detected, the at least one processor is configured to execute the predetermined processing based on the execution result of the fraud detection.

13. The fraud detection system according to claim 1, wherein the predetermined processing is payment processing, and
wherein, when the detection target is detected, the at least one processor is configured to execute the payment processing based on the execution result of the fraud detection and payment information on the user.

14. A fraud detection method using a machine learning model for executing predetermined processing when a detection target is detected by using a detection device, the fraud detection method comprising:
determining, before the detection target is detected, whether a predetermined action has been performed by a user having a user terminal;
executing, when it is determined that the predetermined action has been performed, fraud detection on the user based on identification information stored in the user terminal, said fraud detection being executed by the machine learning model;
executing, when the detection target is detected, the predetermined processing based on an execution result of the fraud detection;
wherein the detection target is a code displayed on the user terminal,
wherein the detection device is used to detect the code, and is external to the user terminal,
wherein the predetermined action is a display action for displaying the code on the user terminal,
wherein the at least one processor is configured to determine, before the code is detected, whether the display action has been performed,
wherein, when it is determined that the display action has been performed, executing the fraud detection based on the identification information,
wherein, when the code is detected, executing the predetermined processing based on the execution result of the fraud detection;
wherein the machine learning model outputs a probability of the code being used by the user;
wherein the machine learning model outputs a fraud detection result, in real time, using the probability as an input;
wherein when fraud is detected, the user is not permitted to enter a facility; and
wherein when fraud is not detected, the user is permitted to enter the facility by opening an entrance gate to the facility.

15. A non-transitory computer-readable information storage medium for storing a program for causing a computer to execute using a machine learning model, when it is determined that a predetermined action has been performed by a user having a user terminal before a detection target is detected by using a detection device in order to execute predetermined processing, fraud detection on the user based on identification information stored in the user terminal, said fraud detection being executed by the machine learning model;
  wherein the detection target is a code displayed on the user terminal,
  wherein the detection device is used to detect the code, and is external to the user terminal,
  wherein the predetermined action is a display action for displaying the code on the user terminal,
  wherein the computer is configured to determine, before the code is detected, whether the display action has been performed,
  wherein, when it is determined that the display action has been performed, the computer is configured to execute the fraud detection based on the identification information,
  wherein, when the code is detected, the at least one processor is configured to execute the predetermined processing based on the execution result of the fraud detection;
  wherein the machine learning model outputs a probability of the code being used by the user;
  wherein the machine learning model outputs a fraud detection result, in real time, using the probability as an input;
  wherein when fraud is detected, the user is not permitted to enter a facility; and
  wherein when fraud is not detected, the user is permitted to enter the facility by opening an entrance gate to the facility.

16. The fraud detection system according to claim 1, wherein the machine learning model outputs the probability of the code being used by the user based on at least one of a position information on the user terminal, a date or time when the display action is performed, a distance from the user terminal to a facility, or a usage history of the user.

* * * * *